(12) United States Patent
Lee et al.

(10) Patent No.: US 8,338,977 B2
(45) Date of Patent: Dec. 25, 2012

(54) HYBRID VERTICAL AXIS ENERGY APPARATUS

(76) Inventors: William Edward Lee, Kailua, HI (US);
Robert F. Pienkowski, Chicago, IL (US)

( * ) Notice: Subject to any disclaimer, the term of this patent is extended or adjusted under 35 U.S.C. 154(b) by 170 days.

(21) Appl. No.: 12/876,164

(22) Filed: Sep. 6, 2010

(65) Prior Publication Data
US 2011/0215583 A1    Sep. 8, 2011

Related U.S. Application Data

(60) Provisional application No. 61/310,690, filed on Mar. 4, 2010.

(51) Int. Cl.
*F03D 9/00* (2006.01)
*H02P 9/04* (2006.01)

(52) U.S. Cl. ......................................................... 290/44

(58) Field of Classification Search .................... 290/44, 290/55; 60/641.12, 641.11, 698, 398; 320/101; 323/906
See application file for complete search history.

(56) References Cited

U.S. PATENT DOCUMENTS

| | | | | |
|---|---|---|---|---|
| 4,119,863 A * | 10/1978 | Kelly | .............................. | 290/55 |
| 4,224,528 A | 9/1980 | Argo | | |
| 4,379,972 A * | 4/1983 | Sosa et al. | ....................... | 290/44 |
| 4,433,544 A * | 2/1984 | Wells et al. | ................ | 60/641.12 |
| 4,551,631 A * | 11/1985 | Trigilio | ........................... | 290/55 |
| 4,935,639 A * | 6/1990 | Yeh | .................................. | 290/55 |
| 5,394,016 A | 2/1995 | Hickey | | |
| 5,463,257 A * | 10/1995 | Yea | .................................. | 290/55 |
| 6,097,104 A | 8/2000 | Russell | | |
| 6,590,300 B1 * | 7/2003 | Preito Santiago | .............. | 290/55 |
| 7,453,167 B2 * | 11/2008 | Gilbert | ............................ | 290/55 |
| 7,821,151 B2 * | 10/2010 | Le et al. | .......................... | 290/55 |
| 2007/0152453 A1 * | 7/2007 | Hicks et al. | ..................... | 290/55 |
| 2009/0189394 A1 * | 7/2009 | DeAngeles | ..................... | 290/44 |
| 2009/0261595 A1 * | 10/2009 | Poo | .................................. | 290/55 |
| 2010/0107633 A1 * | 5/2010 | Tsao | ............................ | 60/641.8 |
| 2010/0219643 A1 * | 9/2010 | Biucchi et al. | .................. | 290/55 |
| 2010/0230974 A1 * | 9/2010 | Cantwell | ........................ | 290/55 |
| 2011/0021134 A1 * | 1/2011 | Zwern | ........................... | 454/343 |

* cited by examiner

*Primary Examiner* — Julio Gonzalez
(74) *Attorney, Agent, or Firm* — Ash Tankha; Lipton, Weinberger & Husick

(57) ABSTRACT

A hybrid vertical axis energy apparatus comprising a housing assembly, a drive mechanism, a solar device, a motor, a vertical axle, and an electrical generator, is provided. The housing assembly is configured to rotate along its vertical axis in response to a force of wind and a force of thermal updraft of air flow. The drive mechanism is rigidly attached to the housing assembly and is in engageable communication with an adjacent drive mechanism attached on an adjacent housing assembly. The solar device is rigidly attached to the housing assembly. The motor is connected to and in electric communication with the solar device. The vertical axle is rigidly connected to the motor's axial shaft. The electrical generator is rotatably connected to the housing assembly or the adjacent housing assembly and converts the mechanical energy produced by rotation of the housing assembly and the adjacent housing assembly into electrical energy.

19 Claims, 20 Drawing Sheets

HYBRID VERTICAL AXIS ENERGY APPARATUS

CROSS REFERENCE TO RELATED APPLICATIONS

This application claims the benefit of provisional patent application No. 61/310,690 titled "Hybrid Vertical Axis Energy Apparatus", filed on Mar. 4, 2010 in the United States Patent and Trademark Office.
The specification of the above referenced application is incorporated herein by reference in its entirety.

BACKGROUND

Conventional vertical axis wind turbines harness the energy of wind and convert the energy to a form of mechanical energy. The mechanical energy may further be converted to electrical energy based on the application in which the vertical axis wind turbine is used. Conventional vertical axis wind turbines that utilize only wind energy produce less mechanical energy and subsequently less electrical energy. The vertical axis wind turbines are typically spaced apart and installed at windy areas to produce electrical energy. Each of these spaced apart vertical axis wind turbines produce a limited amount of electrical energy which may be insufficient to meet the requirements of a user. Therefore, in addition to combining various sources of energy such as wind energy, solar energy, etc., there is a need for operatively interconnecting multiple vertical axis wind turbines to produce a larger amount of electrical energy.

Hence, there is a long felt but unresolved need for a hybrid vertical axis energy apparatus that harnesses multiple sources of energy and that can be interconnected to additional apparatuses to produce additional mechanical energy and therefore additional electrical energy in order to meet the increasing electricity needs of a user.

SUMMARY OF THE INVENTION

This summary is provided to introduce a selection of concepts in a simplified form that are further described in the detailed description of the invention. This summary is not intended to identify key or essential inventive concepts of the claimed subject matter, nor is it intended for determining the scope of the claimed subject matter.

The hybrid vertical axis energy apparatus and method disclosed herein addresses the above stated needs for harnessing multiple sources of energy, for example, wind energy, solar energy, and a force of thermal updraft of air to produce additional mechanical energy and electrical energy in order to meet the increasing electricity needs of a user. The hybrid vertical axis energy apparatus disclosed herein can also be operatively interconnected to multiple hybrid vertical axis energy apparatuses to produce a larger amount of electrical energy.

The hybrid vertical axis energy apparatus disclosed herein comprises a housing assembly, a drive mechanism, a solar device, and an electrical generator. The housing assembly is configured to rotate along its vertical axis in response to a force of wind and a force of convection produced by a thermal updraft of air flow. Rotation of the housing assembly produces mechanical energy. In an embodiment, the housing assembly is, for example, of a cylindrical shape, a conical shape, or a bulged cylindrical shape. In an embodiment, the housing assembly comprises flashings that define an outer surface of the housing assembly. In another embodiment, the housing assembly comprises a side wall, wherein flashings are defined along the side wall of the housing assembly. In another embodiment, the flashings extend from an upper end of the housing assembly to a lower end of the housing assembly and together define a winged side wall. The housing assembly rotates along its vertical axis in response to the force of wind on the flashings. Each of the flashings is of a predetermined shape, for example, a tear drop shape, a spade shape, a curved shape, etc. In an embodiment, each of the flashings has, for example, a straight profile, a curved profile, or a curvilinear profile.

In another embodiment, the housing assembly further comprises a generally spiral groove defined along an inner surface of the housing assembly. In this embodiment, the housing assembly rotates along its vertical axis in response to the force of thermal updraft of air flow against the generally spiral groove.

The drive mechanism, for example, a gear ring, a friction wheel, etc. is rigidly attached to the housing assembly and is in engageable communication with an adjacent drive mechanism attached on an adjacent housing assembly. The engageable communication between the drive mechanism on the housing assembly and the adjacent drive mechanism attached on the adjacent housing assembly enables transfer of mechanical energy between the housing assembly and the adjacent housing assembly. The housing assembly is connected to the adjacent housing assembly and arranged in, for example, a straight line configuration, a circular configuration, a curvilinear configuration, etc. In another embodiment, a channeling device is detachably attached to the hybrid vertical axis energy apparatus to streamline the force of wind on the flashings of the housing assembly and the adjacent housing assembly.

The solar device, for example, a photovoltaic cell, is rigidly attached to an upper end of the housing assembly. The solar device captures solar energy from sunlight and converts the solar energy into electrical energy. In an embodiment, the hybrid vertical axis energy apparatus disclosed herein further comprises a dome positioned on the upper end of the housing assembly for accommodating the solar device. In an embodiment, the dome accommodating the rigidly attached solar device extends beyond a periphery of the upper end of the housing assembly. In another embodiment, a diameter of the drive mechanism extends beyond a diameter of the dome.

In an embodiment, the hybrid vertical axis energy apparatus disclosed herein further comprises a motor and a vertical axle. The motor is connected to and is in electric communication with the solar device. The motor is coaxially disposed below the solar device. The vertical axle is rigidly connected to an axial shaft of the motor and coaxially positioned within the housing assembly along the vertical axis of the housing assembly. The housing assembly is rotatably connected to the vertical axle. In an embodiment, the hybrid vertical axis energy apparatus disclosed herein further comprises a bearing or a sleeve for enabling the rotatable connection of the housing assembly to the vertical axle.

In another embodiment, the hybrid vertical axis energy apparatus disclosed herein further comprises a fan disposed within the housing assembly. The fan comprises one or more blades and is rigidly attached to the inner surface of the housing assembly via the blades. The fan is also rotatably attached to the vertical axle by a bearing. Each of the blades of the fan is inclined at an angle with respect to the vertical axis of the housing assembly to rotate the housing assembly in response to the force of thermal updraft of air flow. The fan rotates along with the rigidly attached housing assembly in response to the thermal updraft of air. Furthermore, the fan also directs the thermal updraft of air centrifugally against the spiral groove defined along the inner surface of the housing assembly. This direction of thermal updraft of air against the spiral groove by the fan creates an additional force for rotation of the housing assembly.

In another embodiment, the hybrid vertical axis energy apparatus disclosed herein further comprises vents defined by the flashings on the housing assembly to exhaust the thermal updraft of air flow from the housing assembly. In another embodiment, multiple vents may be positioned proximal to the upper end of the housing assembly to exhaust the thermal updraft of air flow into the environment from the upper end of the housing assembly. This exhaust of the thermal updraft of air ensures that a continuous stream of the thermal updraft of air enters the housing assembly through the lower end of the housing assembly.

The electrical generator is rotatably connected to the housing assembly or an adjacent housing assembly via the drive mechanism or the adjacent drive mechanism respectively. In an embodiment, the electrical generator comprises a drive mechanism in engageable communication with the drive mechanism on the housing assembly or the adjacent drive mechanism on the adjacent housing assembly. The drive mechanism on the housing assembly or the adjacent drive mechanism on the adjacent housing assembly engageably communicates with the drive mechanism of the electrical generator for transferring the mechanical energy produced by the housing assembly and the adjacent housing assembly to the electrical generator. The drive mechanism on the housing assembly is, for example, a gear ring or a friction wheel, and the drive mechanism provided on the electrical generator is a corresponding gear ring or a roller wheel respectively. The electrical generator converts mechanical energy produced by rotation of the housing assembly and the adjacent housing assembly into electrical energy. The hybrid vertical axis energy apparatus disclosed herein therefore produces energy.

In another embodiment, the hybrid vertical axis energy apparatus disclosed herein further comprises a storage device electrically connected to the solar device and the electrical generator to store the electrical energy of the solar device and the electrical generator. In another embodiment, the hybrid vertical axis energy apparatus further comprises a switch in electric communication with the solar device, the motor, and the storage device. The switch electrically disconnects the solar device from the motor and transfers the electrical energy produced by the solar device to the storage device. The hybrid vertical axis energy apparatus further comprises a slip ring positioned on the axial shaft of the motor to enable the solar device to transmit the electrical energy to the storage device on electrical disconnection of the motor from the solar device. In another embodiment, in the absence of the motor, the slip ring is directly connected and in electric communication with the solar device to allow a continuous transfer of the electrical energy from the solar device to the storage device.

BRIEF DESCRIPTION OF THE DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific components and methods disclosed herein.

DETAILED DESCRIPTION OF THE INVENTION

Figure 1A:
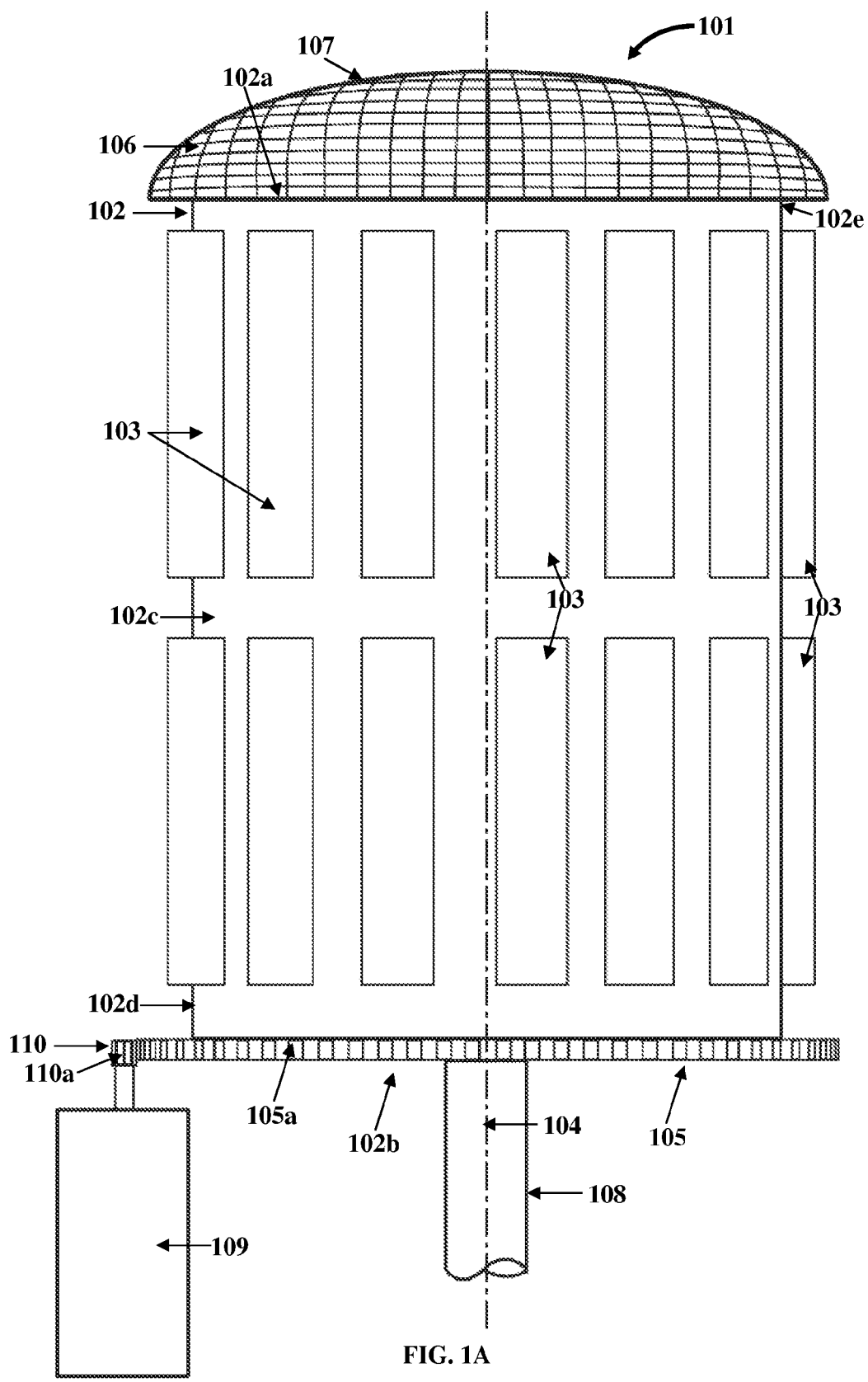
FIGS. 1A-1B exemplarily illustrate front orthogonal views of embodiments of a hybrid vertical axis energy apparatus, showing a housing assembly communicating with an electrical generator via corresponding drive mechanisms.
Figure 1B:
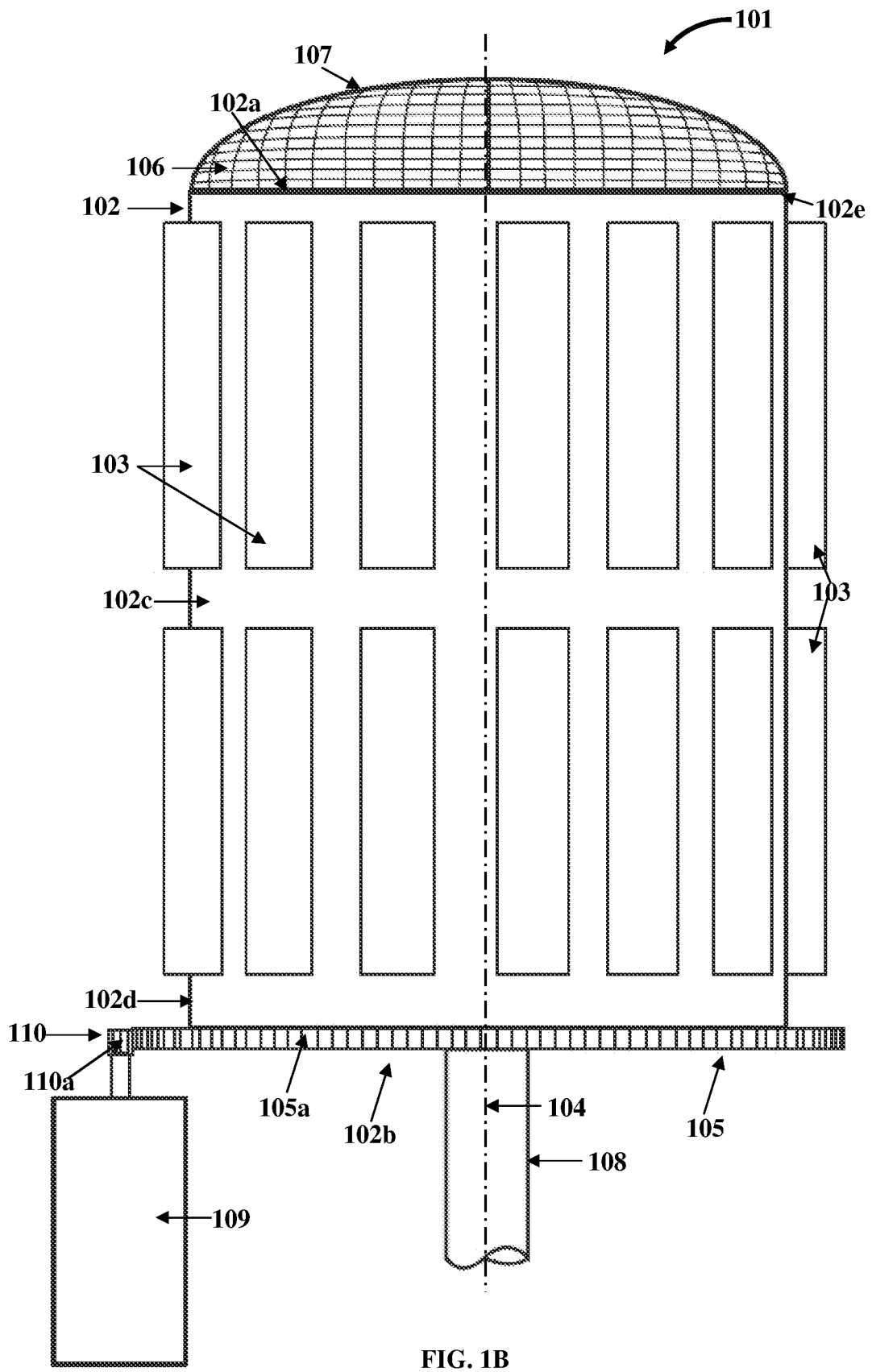

FIGS. 1A-1B exemplarily illustrate front orthogonal views of embodiments of a hybrid vertical axis energy apparatus 101, showing a housing assembly 102 communicating with an electrical generator 109 via corresponding drive mechanisms 105 and 110 respectively. The hybrid vertical axis energy apparatus 101 disclosed herein comprises a housing assembly 102, a vertical axle 108, a solar device 106, for example, a photovoltaic cell, a drive mechanism 105, and an electrical generator 109. The housing assembly 102 is configured to rotate in a direction, for example, a clockwise direction or a counterclockwise direction, along its vertical axis 104 in response to a force of wind directed against flashings 103, the force of thermal updraft of air against a generally spiral groove 115 provided within the housing assembly 102, which rotates the housing assembly 102 as exemplarily illustrated in FIGS. 2-3. Rotation of the housing assembly 102 produces mechanical energy. The thermal updraft of air passes from an open lower end 102b of the housing assembly 102 through the spiral groove 115. In an embodiment as exemplarily illustrated in FIGS. 1A-1B and FIGS. 2-11, the housing assembly 102 is of a generally cylindrical shape. Alternatively, the housing assembly 102 is, for example, of a conical shape or a bulged cylindrical shape. As exemplarily illustrated in FIGS. 1A-1B and FIGS. 2-6, the housing assembly 102 comprises a closed upper end 102a, the open lower end 102b, and a side wall 102d defined between the closed upper end 102a and the open lower end 102b. The side wall 102d of the housing assembly 102 is, for example, a cylindrical wall for the housing assembly 102 of a cylindrical shape as exemplarily illustrated in FIGS. 1A-1B and FIGS. 2-6.

The vertical axle 108 of the hybrid vertical axis energy apparatus 101 disclosed herein is coaxially positioned within the housing assembly 102 along the vertical axis 104 of the housing assembly 102. The housing assembly 102 is rotatably connected to the vertical axle 108, for example, by bearings 114a and 114b as exemplarily illustrated in FIGS. 2-7 and FIG. 11.

In an embodiment, the housing assembly 102 comprises the flashings 103, defining an outer surface 102c of the housing assembly 102. The housing assembly 102 rotates along its vertical axis 104 in response to a force of wind on the flashings 103. In an embodiment as exemplarily illustrated in FIGS. 1A-1B and FIGS. 2-6, the flashings 103 are defined along the side wall 102d of the housing assembly 102. Each of the flashings 103 is of a predetermined shape, for example, a tear drop shape as exemplarily illustrated in FIGS. 7-11, a spade shape, a curved shape, etc. and is arranged adjacent to each other about the vertical axle 108. Each of the flashings 103 provided on the outer surface 102c of the housing assembly 102 has, for example, a straight profile as exemplarily illustrated in FIG. 10, a curved profile as exemplarily illustrated in FIGS. 8-9, or a curvilinear profile for increasing the surface area of exposure of the housing assembly 102 to the force of wind to increase the speed of rotation of the housing assembly 102.

The solar device 106 of the hybrid vertical axis energy apparatus 101 disclosed herein is rigidly attached to the closed upper end 102a of the housing assembly 102. The solar device 106 captures solar energy from sunlight and converts the captured solar energy into electrical energy. The solar device 106 disclosed herein, may be configured to capture a greater amount of solar energy. For example, the solar device 106 is of, for example, a semi-spherical shape, a conical shape, etc. to increase the area of exposure of the solar device 106 to sunlight. Furthermore, the solar device 106 may also be manufactured from various processes and materials or surface films, for example, silicon, aluminum, etc., that allow the solar device 106 to capture a greater amount of solar energy to provide a higher conversion efficiency of the solar energy to electrical energy. The processes enable, for example, the provision of integrated reflectors (not shown) to concentrate solar energy on the solar device 106. The solar device 106 is also configured for flexibility, which assists the solar device 106 in taking up a desired shape for capturing a greater amount of solar energy incident on the solar device 106.

In an embodiment as exemplarily illustrated in FIGS. 1A-1B, FIGS. 2-7, and FIGS. 9-11, the hybrid vertical axis energy apparatus 101 disclosed herein further comprises a dome 107 positioned on the closed upper end 102a of the housing assembly 102 for accommodating the solar device 106. In the embodiment as exemplarily illustrated in FIG. 1A, FIGS. 2-7, FIGS. 9-11, and FIGS. 16-17, the dome 107 accommodating the rigidly attached solar device 106 extends beyond a periphery 102e of the closed upper end 102a of the housing assembly 102. In this embodiment, the diameter of the drive mechanism 105 of the housing assembly 102 extends beyond the diameter of the dome 107. In another embodiment as exemplarily illustrated in FIG. 1B and FIGS. 12-15, the dome 107 is positioned on the closed upper end 102a of the housing assembly 102 and contained within the periphery 102e of the closed upper end 102a of the housing assembly 102.

The drive mechanism 105 of the hybrid vertical axis energy apparatus 101 disclosed herein is rigidly attached around the outer surface 102c of the side wall 102d of the housing assembly 102 at the open lower end 102b of the housing assembly 102. The drive mechanism 105 is in engageable communication with an adjacent drive mechanism 123 attached on an adjacent housing assembly 124 as exemplarily illustrated in FIGS. 12-17. In this manner, multiple housing assemblies 102, 124, 126, 128, 130, 132, 134, 136, 138, 140, 142, and 144 of the hybrid vertical axis energy apparatus 101 may be connected and driven by their respective drive mechanisms 105, 123, 125, 127, 129, 131, 133, 135, 137, 139, 141, and 143 as exemplarily illustrated in FIGS. 12-17. The engageable communication between the drive mechanism 105 on the housing assembly 102 and the adjacent drive mechanism 123 attached on the adjacent housing assembly 124 enables transfer of mechanical energy between the housing assembly 102 and the adjacent housing assembly 124. The transfer of the mechanical energy causes rotation of the housing assembly 102 or the adjacent housing assembly 124. In an embodiment, the flashings 103 of an adjacent housing assembly 124 are oriented in a direction opposite to the orientation of the flashings 103 of the housing assembly 102. The orientation of the flashings 103 is selected based on the opposing direction of rotation of the housing assembly 102 and the adjacent housing assembly 124.

In an embodiment as exemplarily illustrated in FIGS. 1A-1B and FIGS. 2-7, the drive mechanism 105 of the housing assembly 102 is a gear ring 105a rigidly attached around the outer surface 102c of the housing assembly 102. The gear ring 105a on the housing assembly 102 engages with an adjacent gear ring 105a on an adjacent housing assembly 124. The gear ring 105a transfers the mechanical energy of the housing assembly 102 to the gear ring 105a of the adjacent housing assembly 124 or to the electrical generator 109.

As exemplarily illustrated in FIGS. 1A-1B, FIGS. 2-4, and FIG. 6, the drive mechanism 110 rigidly attached to the electrical generator 109 is a gear ring 110a. The drive mechanism 110 of the electrical generator 109 transfers the mechanical energy of the rotating housing assembly 102 to the electrical generator 109 to produce electrical energy by engageably communicating with the rotating drive mechanism 105 on the rotating housing assembly 102. As exemplarily illustrated in FIGS. 1A-1B, FIGS. 2-4, and FIG. 6, the drive mechanisms 105 and 110 of the housing assembly 102 and the electrical generator 109 are gear rings 105a and 110a respectively.

In the embodiments as exemplarily illustrated in FIGS. 1A-1B, FIGS. 2-4, and FIG. 6, the electrical generator 109 is positioned in an upright position below the housing assembly 102. In another embodiment, the electrical generator 109 is positioned in an inverted position alongside the housing assembly 102. In this embodiment, the drive mechanism 110 of the electrical generator 109 is configured to engageably connect to the drive mechanism 105 of the housing assembly 102 with sufficient clearance between the electrical generator 109 and the housing assembly 102. For example, the diameter of the drive mechanism 110 of the electrical generator 109 is extended beyond the diameter of the electrical generator 109.

The electrical generator 109 is rotatably connected to the housing assembly 102 or the adjacent housing assembly 124 via the drive mechanism 105 or the adjacent drive mechanism 123 respectively. The electrical generator 109 comprises a drive mechanism 110 in engageable communication with the drive mechanism 105 on the housing assembly 102 or the adjacent drive mechanism 123 on the adjacent housing assembly 124. The drive mechanism 105 on the housing assembly 102 or the drive mechanism 123 on the adjacent housing assembly 124 engageably communicates with the drive mechanism 110 of the electrical generator 109 for transferring the mechanical energy produced by rotation of the housing assembly 102 and the adjacent housing assembly 124 to the electrical generator 109. For example, the gear ring 105a of the housing assembly 102 engageably communicates with the gear ring 110a of the electrical generator 109 for transferring mechanical energy produced by the rotation of the housing assembly 102 to the electrical generator 109. The electrical generator 109 converts mechanical energy produced by rotation of the housing assembly 102 and the adjacent housing assembly 124 into electrical energy. The hybrid vertical axis energy apparatus 101 disclosed herein thereby produces energy in response to the force of wind directed against the flashings 103, the force of thermal updraft of air directed against the spiral groove 115, and the electrical energy from the solar device 106 and the electrical generator 109.

Figure 2:
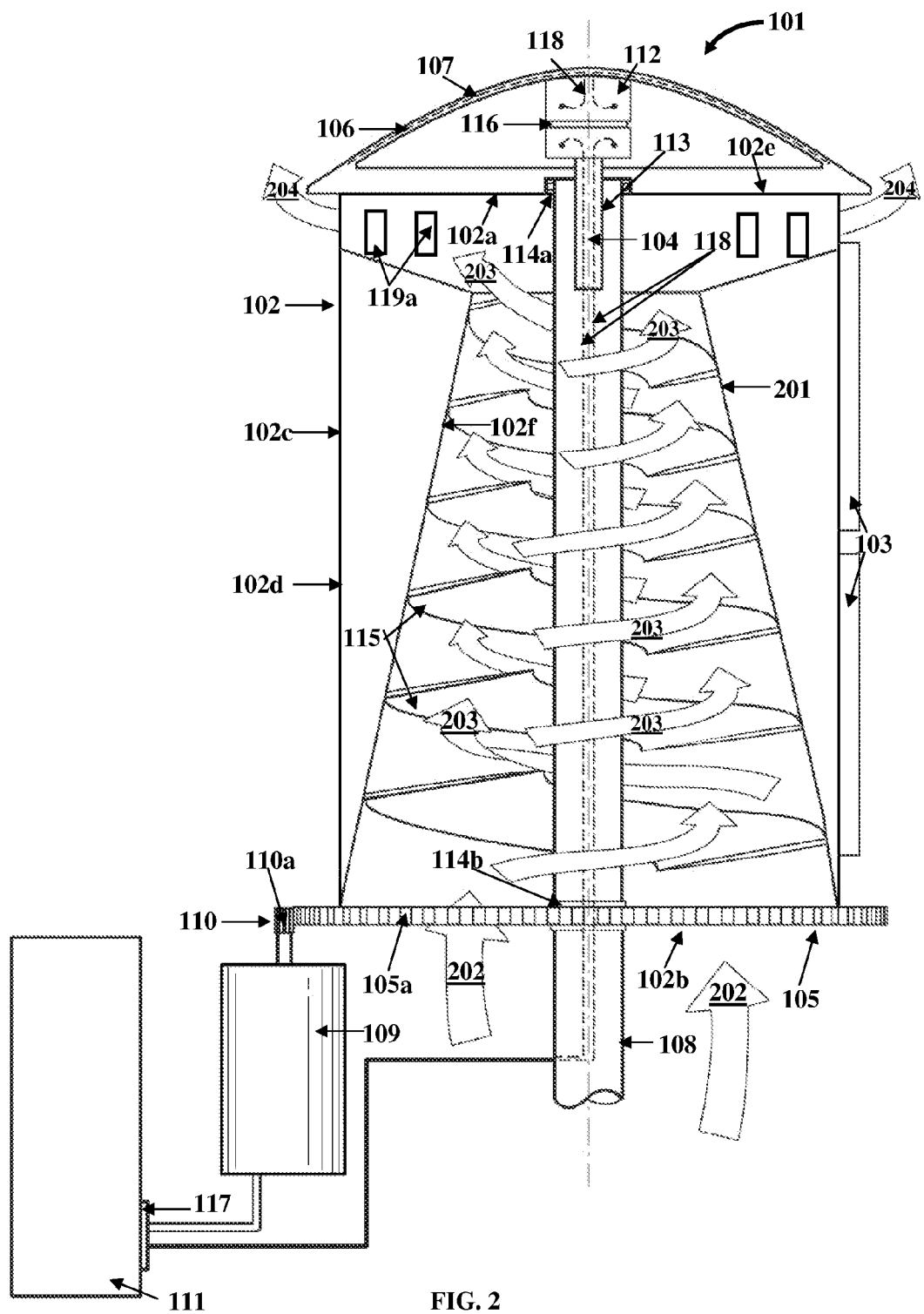
FIG. 2 exemplarily illustrates a partially cut-away front sectional view of an embodiment of the hybrid vertical axis energy apparatus, showing a spiral groove defined along an inner surface of a truncated cone of the housing assembly, a slip ring positioned on an axial shaft of a motor, and vents positioned proximal to the upper end of the housing assembly.
Figure 3:
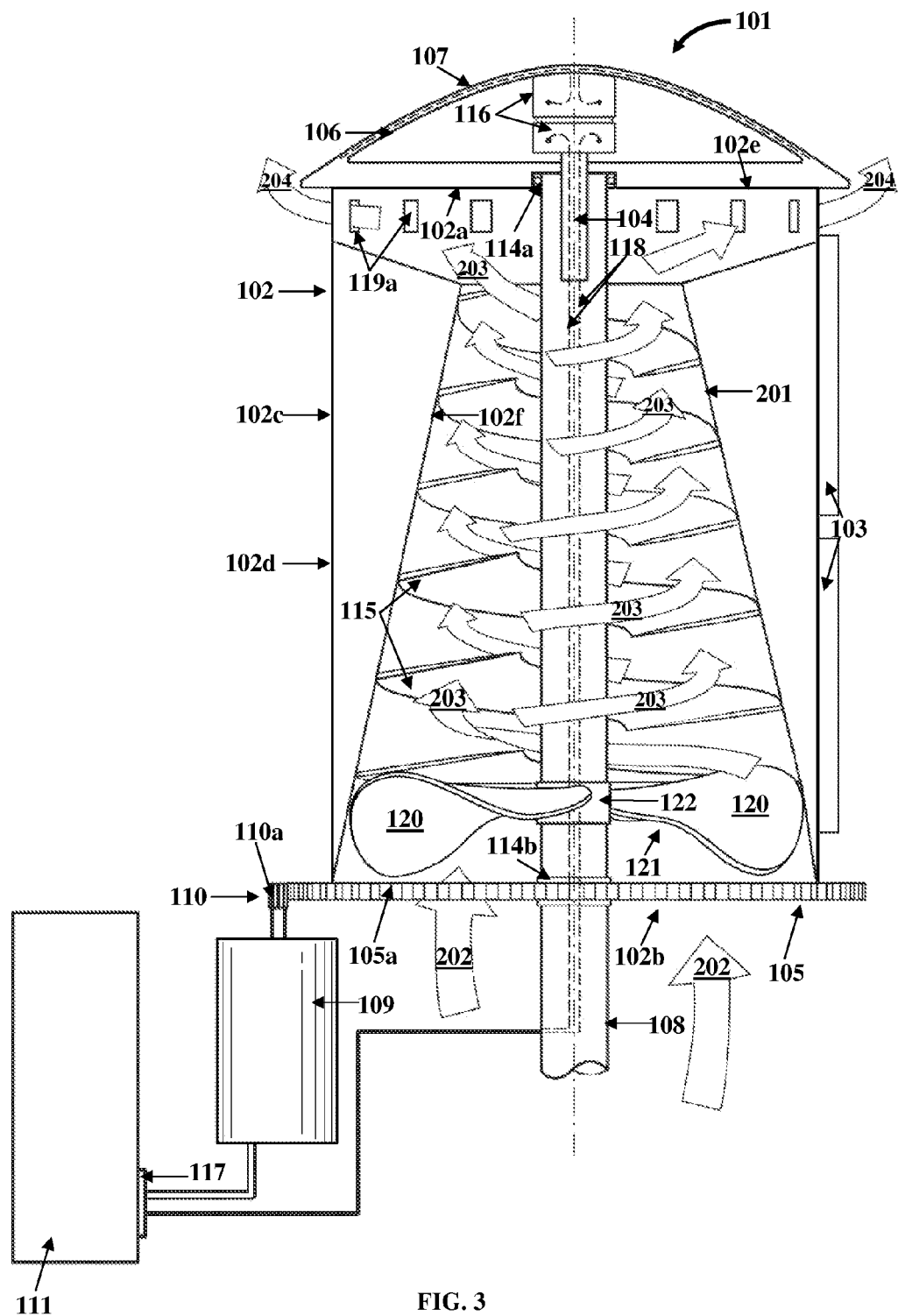
FIG. 3 exemplarily illustrates a partially cut-away front sectional view of an embodiment of the hybrid vertical axis energy apparatus, showing the spiral groove defined along the inner surface of the truncated cone of the housing assembly, the slip ring directly connected and in electric communication with a solar device, and a fan disposed within the housing assembly.

FIG. 2 exemplarily illustrates a partially cut-away front sectional view of an embodiment of the hybrid vertical axis energy apparatus 101, showing a spiral groove 115 defined along an inner surface 102f of a truncated cone 201 of the housing assembly 102, a slip ring 116 positioned on an axial shaft 113 of a motor 112, and vents 119a positioned proximal to the closed upper end 102a of the housing assembly 102. In embodiments as exemplarily illustrated in FIGS. 2-3 and FIG. 6, the hybrid vertical axis energy apparatus 101 disclosed herein comprises a spiral groove 115 defined along an inner surface 102f of the housing assembly 102. In FIGS. 2-3, the inner surface 102f of the housing assembly 102 is defined by a truncated cone 201. The spiral groove 115 is defined within the truncated cone 201 as exemplarily illustrated in FIGS. 2-3. The housing assembly 102 rotates along the vertical axis 104 in response to a force of thermal updraft of air flow against the spiral groove 115. The thermal updraft of air is caused as a result of convection of hot air relative to cold air from the atmosphere. Hot air from below the open lower end 102b of the housing assembly 102 replaces the cold air within the housing assembly 102. This replacement of the cold air by the hot air gives rise to convection currents that appear as the thermal updraft of air. The thermal updraft of air enters the housing assembly 102 through the open lower end 102b of the housing assembly 102 and is directed against the spiral groove 115 for rotating the housing assembly 102.

The air that enters into the housing assembly 102 from the open lower end 102b of the housing assembly 102 is exemplarily illustrated by curved arrows 202. The thermal updraft of the air that flows against the spiral groove 115 within the housing assembly 102 is exemplarily illustrated by curved arrows 203. The air flow against the spiral groove 115 in turn rotates the housing assembly 102. The thermal updraft of air flows towards the closed upper end 102a of the housing assembly 102 and exhausts to the environment, for example, via the vents 119a. In an embodiment, the hybrid vertical axis energy apparatus 101 disclosed herein comprises vents 119a positioned proximal to the closed upper end 102a of the housing assembly 102 to exhaust the thermal updraft of air flow from the housing assembly 102. The exhaustion of the thermal updraft of air through the vents 119a disposed at the closed upper end 102a of the housing assembly 102 is exemplarily illustrated by curved arrows 204. In another embodiment, the vents 119a are absent and the thermal updraft of air exhausts through the vents 119b defined by the flashings 103 as disclosed in the detailed description of FIG. 4.

The solar device 106 is rigidly attached to the dome 107 positioned on the closed upper end 102a of the housing assembly 102. In an embodiment, the hybrid vertical axis energy apparatus 101 disclosed herein further comprises a motor 112. The motor 112 is connected to and is in electric communication with the solar device 106 rigidly attached to the dome 107. The motor 112 is coaxially disposed below the solar device 106. The solar device 106 captures solar energy from sunlight and converts the captured solar energy into electrical energy. The solar device 106 transfers the electrical energy to the motor 112 to power the motor 112. The motor 112 rotates on receiving the electrical energy and rotates the housing assembly 102.

In this embodiment, the vertical axle 108 of the hybrid vertical axis energy apparatus 101 is rigidly connected to the axial shaft 113 of the motor 112 and coaxially positioned within the housing assembly 102 along the vertical axis 104 of the housing assembly 102 as exemplarily illustrated in FIG. 2. The vertical axle 108 is, for example, a solid vertical axle 108. In another embodiment, the vertical axle 108 may be configured as a hollow axle for accommodating electrical connections, for example, wires 118, of the solar device 106 and a storage device 111. The housing assembly 102 is rotatably connected to the vertical axle 108, for example, by the bearings 114a and 114b, a sleeve, etc. to enable rotation of the housing assembly 102 relative to the vertical axle 108.

In another embodiment, the solar device 106 and the motor 112 are attached to the housing assembly 102 to cause rotation of the housing assembly 102 during operation of the hybrid vertical axis energy apparatus 101. This arrangement assists the housing assembly 102 to rotate and generate electrical energy through the electrical generator 109. In another embodiment, the solar device 106 and the motor 112 are used to provide a turning moment to the housing assembly 102 at a start of the operation of the hybrid vertical axis energy apparatus 101.

In an embodiment, the hybrid vertical axis energy apparatus 101 disclosed herein further comprises a storage device 111 electrically connected to the solar device 106 and the electrical generator 109. The storage device 111 stores the electrical energy output from the solar device 106 and the electrical generator 109. In another embodiment, the hybrid vertical axis energy apparatus 101 disclosed herein further comprises a switch 117 in electric communication with the solar device 106, the motor 112, and the storage device 111. When the housing assembly 102 starts to rotate, the motor 112 is electrically disconnected from the solar device 106 by the switch 117, and the electrical energy output from the solar device 106 is transferred to the storage device 111 for later use.

In another embodiment, the hybrid vertical axis energy apparatus 101 disclosed herein further comprises a slip ring 116 positioned on the axial shaft 113 of the motor 112. The solar device 106 is in electric communication with the slip ring 116, for example, by the wires 118. The slip ring 116 enables the solar device 106 to transmit the electrical energy to the storage device 111 when the motor 112 is electrically disconnected from the solar device 106 via the switch 117. The slip ring 116 is rigidly attached onto the axial shaft 113 of the motor 112. The vertical axle 108 houses the wires 118 that connect the solar device 106 to the storage device 111 via the slip ring 116. The electrical energy is continuously transferred from the solar device 106 to the storage device 111 through the wires 118 via the slip ring 116.

The slip ring 116 enables the solar device 106 to execute continuous rotations while electrical energy is continuously transferred from the solar device 106 to the storage device 111 via the slip ring 116. The switch 117 may be positioned proximal to the storage device 111 as exemplarily illustrated in FIGS. 2-4 and FIG. 6, or positioned proximal to the solar device 106 or positioned at a predetermined position desired by a user. The housing assembly 102 continues to rotate along with the motor 112 and the solar device 106, even after the electrical disconnection of the motor 112 and the solar device 106 by the switch 117. In this case, the motor 112 is not powered by the solar device 106, but rotates due to the motor's 112 rigid connection to the housing assembly 102. The housing assembly 102 rotates by the force of wind on the flashings 103 and the force of thermal updraft of air against the spiral groove 115. The motor 112 remains disconnected from the solar device 106 and rotates only by virtue of its rigid connection to the rotating solar device 106 and the housing assembly 102. Meanwhile, the electrical energy of the solar device 106 is also concurrently transferred to the storage device 111.

Although the slip ring 116 disclosed herein enables continuous rotation of the solar device 106 while transferring electrical energy to the storage device 111, the continuous rotation of the solar device 106 with the transfer of the electrical energy to the storage device 111 may also be accomplished using other functionally equivalent structures, for example, a clutch, double clutch, etc.

The rotation of the housing assembly 102 rotates the solar device 106 as the solar device 106 converts solar energy into electrical energy. This rotation of the solar device 106 ensures an extended life span or better mean time before failure (MTBF) of the solar device 106 since the solar device 106 operates at a lower temperature and therefore at a higher solar energy to electrical energy conversion efficiency compared to a stationary solar device. The rotation of the solar device 106 also extends the life span of the solar device 106.

Consider an example where the hybrid vertical axis energy apparatus 101 disclosed in the detailed description of FIGS. 1A-1B and FIG. 2 is utilized. Wind impinges on the flashings 103 on the housing assembly 102. The force of wind against the flashings 103 causes rotation of the housing assembly 102. The thermal updraft of air flow causes a spinning effect of the housing assembly 102 caused by the upward air flow impinging and moving along the spiral groove 115 defined along the inner surface 102f of the housing assembly 102. This spinning effect also causes the housing assembly 102 to rotate about the vertical axle 108 on which the housing assembly 102 is rotatably connected. Furthermore, the solar device 106 disposed on the closed upper end 102a of the housing assembly 102 receives solar energy from sunlight and converts the solar energy into electrical energy. The electrical energy of the solar device 106 is transferred to the motor 112 and causes the motor 112 to rotate about its axial shaft 113 rigidly connected to the vertical axle 108 within the housing assembly 102. The motor 112 further rotates the housing assembly 102. The rotation of the housing assembly 102 rotates the electrical generator 109 that is rotatably connected to the drive mechanism 105 of the housing assembly 102 via its drive mechanism 110. The electrical generator 109 converts the mechanical energy of the housing assembly 102 into electrical energy. The hybrid vertical axis energy apparatus 101 disclosed herein thereby produces energy.

FIG. 3 exemplarily illustrates a partially cut-away front sectional view of an embodiment of the hybrid vertical axis energy apparatus 101, showing the spiral groove 115 defined along the inner surface 102f of the truncated cone 201 of the housing assembly 102, the slip ring 116 directly connected and in electric communication with the solar device 106, and a fan 121 disposed within the housing assembly 102. This slip ring 116 allows the solar device 106 to continuously transfer the electrical energy to the storage device 111. In this embodiment, the motor 112 is absent and the electrical energy from the solar device 106 is directly transferred to the storage device 111 via the slip ring 116 and the wires 118. In this embodiment, the vertical axle 108 may be configured as a hollow axle for accommodating the electrical connections, for example, the wires 118, of the solar device 106 and the storage device 111. The housing assembly 102 also rotates about the vertical axle 108 along its vertical axis 104 by the force of wind on the flashings 103 and the force of thermal updraft of air through the spiral groove 115. The air flows into the housing assembly 102 from the open lower end 102b of the housing assembly 102, against the spiral groove 115 within the housing assembly 102, and out from the housing assembly 102 via the vents 119a. The direction of air flow is exemplarily illustrated by the curved arrows 202, 203, and 204.

Consider an example in which the hybrid vertical axis energy apparatus 101 as disclosed in the detailed description of FIG. 3 is utilized. This embodiment of the hybrid vertical axis energy apparatus 101 operates in the absence of the motor 112. The solar device 106 captures solar energy from sunlight and converts the captured solar energy into electrical energy which is directly transferred to the storage device 111 via the slip ring 116 and the wires 118 through the hollow vertical axle 108. The housing assembly 102 comprising the flashings 103 and the spiral groove 115 rotates in response to the force of wind and the force of thermal updraft of air to produce mechanical energy. This mechanical energy is transferred to the electrical generator 109 by engageable communication of the drive mechanisms 105 and 110. The electrical generator 109 converts this mechanical energy of the housing assembly 102 into electrical energy and transfers the electrical energy to the storage device 111. Thus, the electrical energy from the solar device 106 and the electrical energy from the electrical generator 109 are stored in the storage device 111. The hybrid vertical axis energy apparatus 101 thereby produces energy.

Figure 4:
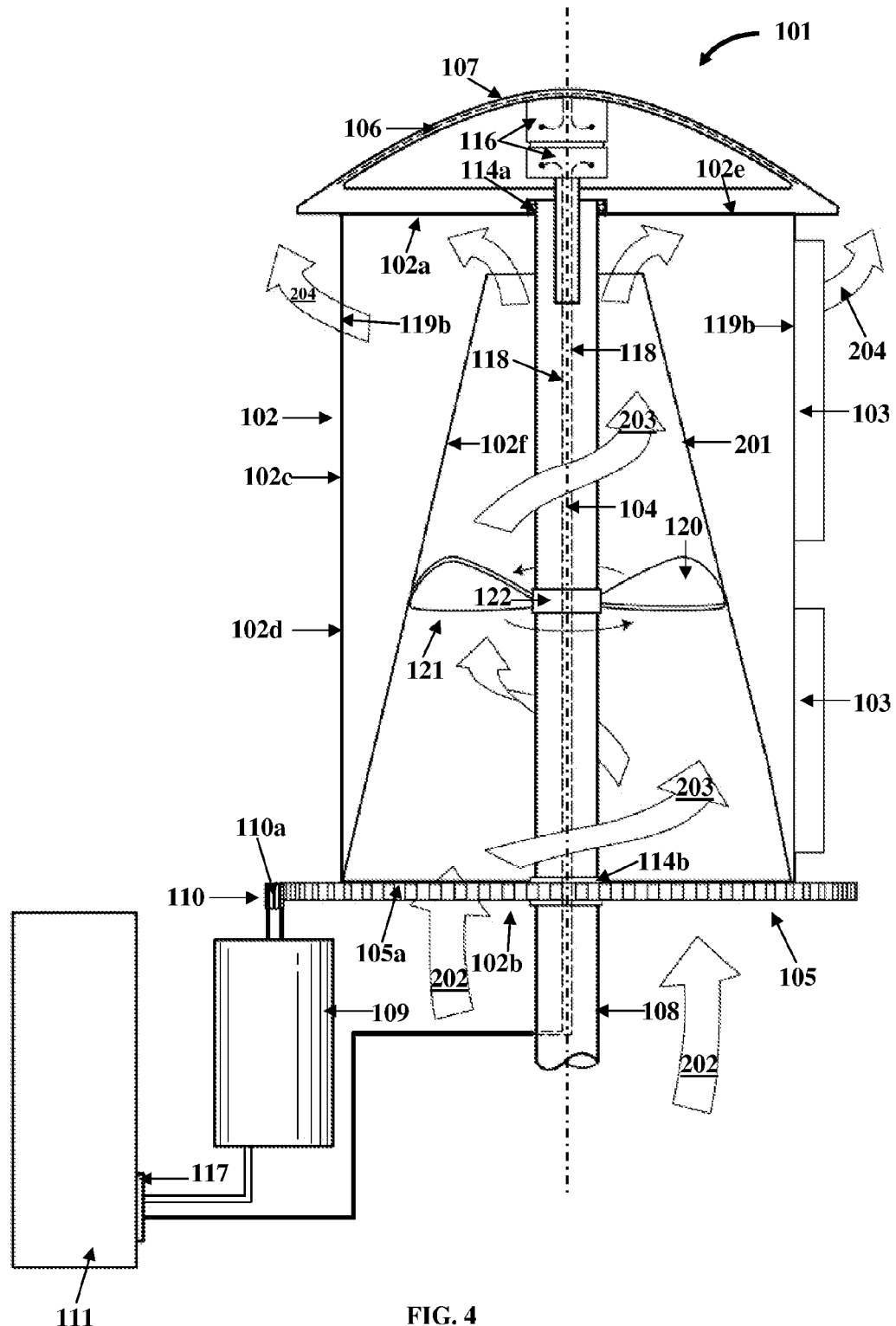
FIG. 4 exemplarily illustrates a partially cut-away front sectional view of an embodiment of the hybrid vertical axis energy apparatus, showing a fan disposed within the housing assembly, and vents defined by flashings on the housing assembly.

FIG. 4 exemplarily illustrates a partially cut-away front sectional view of an embodiment of the hybrid vertical axis energy apparatus 101, showing a fan 121 disposed within the housing assembly 102, and vents 119b defined by the flashings 103 on the housing assembly 102. In this embodiment, the hybrid vertical axis energy apparatus 101 disclosed herein further comprises vents 119b defined by the flashings 103 on the housing assembly 102 to allow the thermal updraft of air flow from within the housing assembly 102 to exhaust to the environment.

In this embodiment, the hybrid vertical axis energy apparatus 101 further comprises a fan 121 disposed within the housing assembly 102. The fan 121 comprises one or more blades 120. The fan 121 is rigidly attached to the inner surface 102f of the housing assembly 102 via the blades 120. The fan 121 is also rotatably attached to the vertical axle 108, for example, by a bearing 122. Each of the blades 120 of the fan 121 is inclined at an angle with respect to the vertical axis 104 of the housing assembly 102 to allow the blades 120 of the fan 121 to rotate by the upward air flow that enters into the housing assembly 102 from the open lower end 102b of the housing assembly 102, as exemplarily illustrated by the curved arrows 202. The thermal updraft of air rotates the fan 121 within the housing assembly 102 as exemplarily illustrated in FIG. 4. The fan 121 in turn rotates the rigidly attached housing assembly 102 in response to this thermal updraft of air. The air flows upwardly as exemplarily illustrated by the curved arrows 203 and exhausts out to the environment as exemplarily illustrated by the curved arrows 204 via the vents 119b defined by the flashings 103. In the embodiment exemplarily illustrated in FIG. 4, the fan 121 is used for rotating the housing assembly 102 without the spiral groove 115. In another embodiment as exemplarily illustrated in FIG. 3, the fan 121 is used in conjunction with the spiral groove 115 to rotate the housing assembly 102. The direction of thermal updraft of air against the spiral groove 115 by the fan 121 creates an additional force for rotation of the housing assembly 102.

Figure 5:
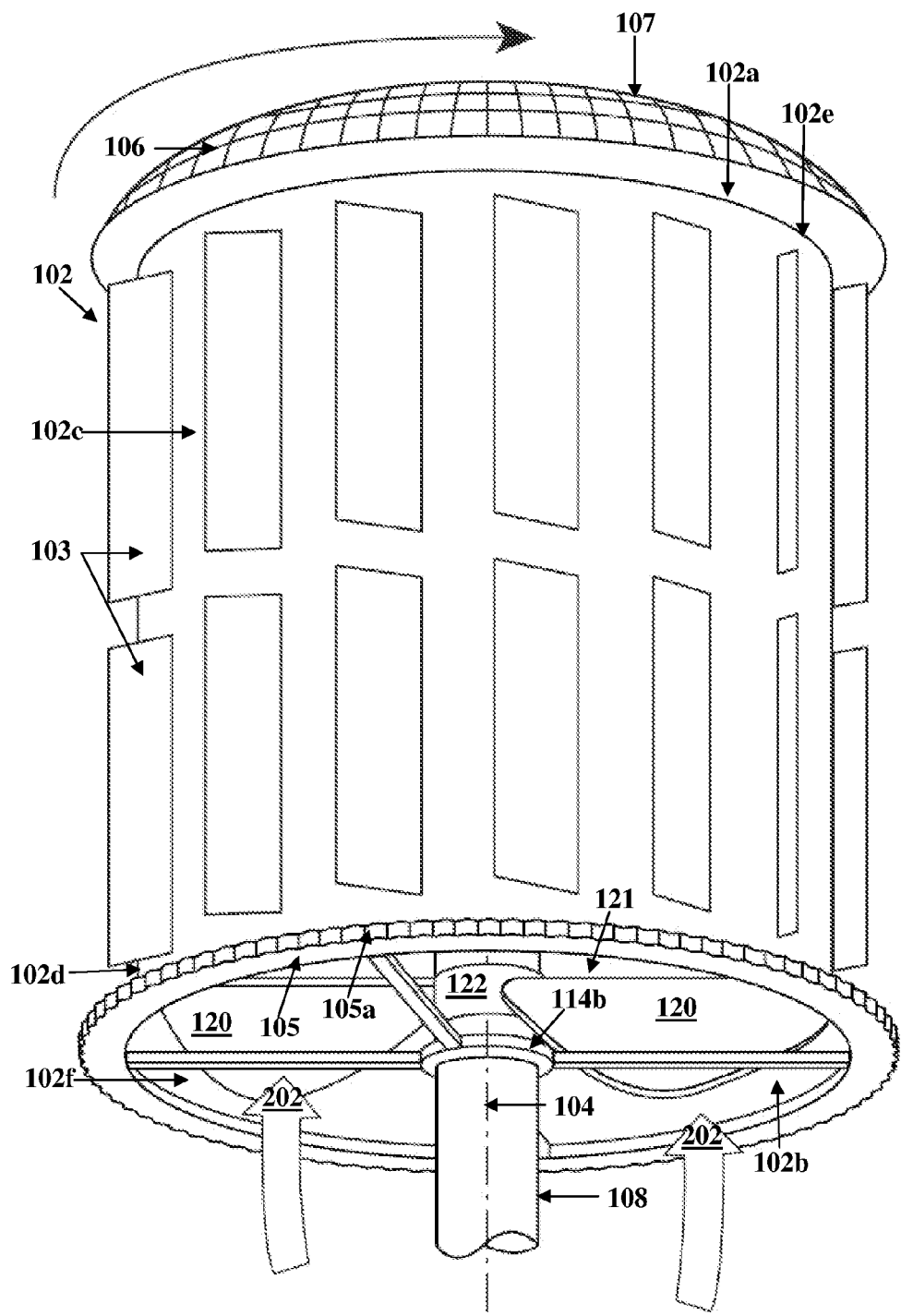
FIG. 5 exemplarily illustrates a bottom perspective view of the hybrid vertical axis energy apparatus, showing the rotation of the housing assembly.

FIG. 5 exemplarily illustrates a bottom perspective view of the hybrid vertical axis energy apparatus 101, showing the rotation of the housing assembly 102. The housing assembly 102 is, for example, of a generally cylindrical shape. The housing assembly 102 rotates along its vertical axis 104 in response to a force of wind on the flashings 103 defined on the outer surface 102c of the side wall 102d of the housing assembly 102 and rotation of the blades 120 of the fan 121 about the vertical axle 108 via the bearing 122 due to the upward air flow that enters into the housing assembly 102 from the open lower end 102b of the housing assembly 102, as exemplarily illustrated by the curved arrows 202.

Figure 6:
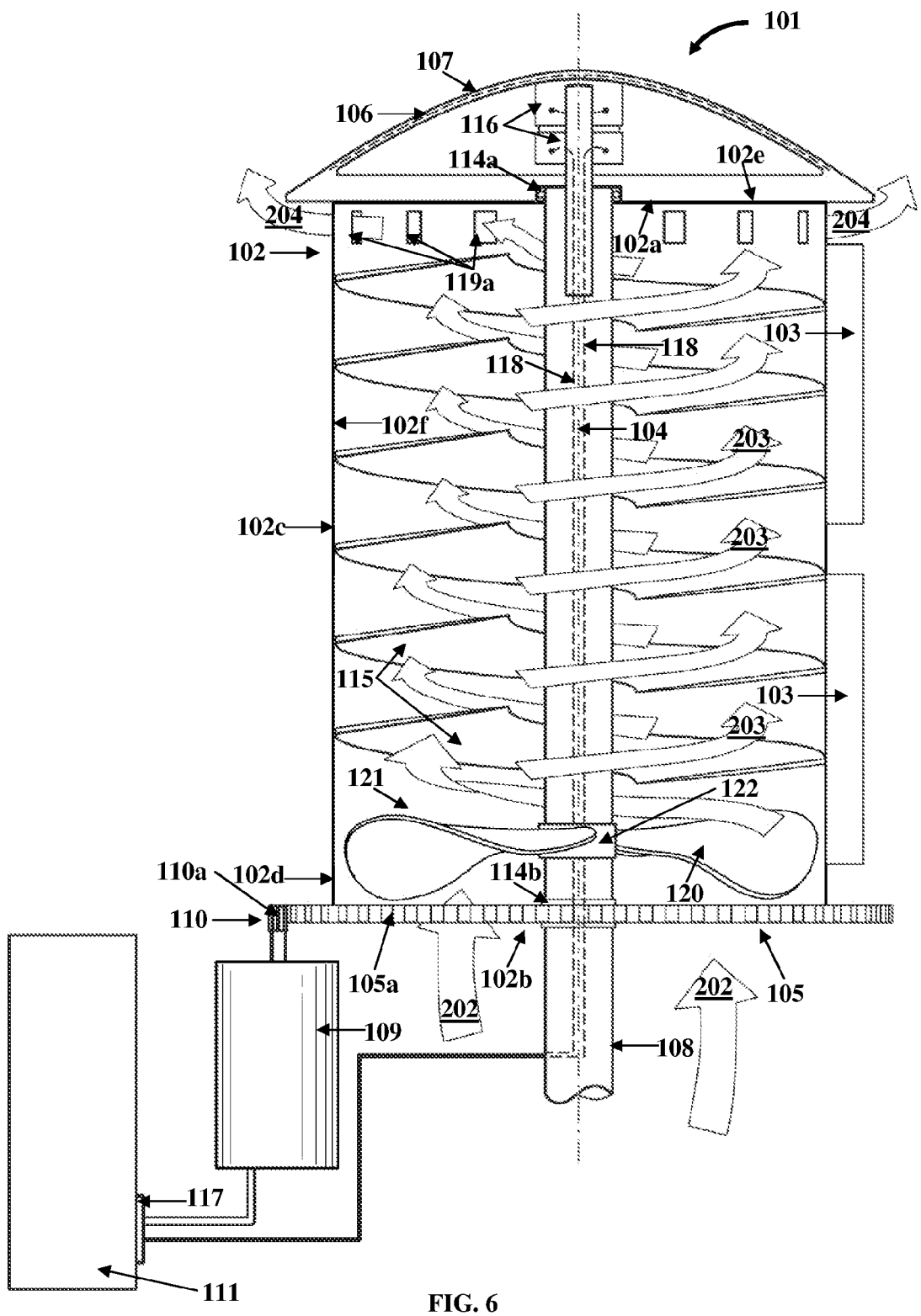
FIG. 6 exemplarily illustrates a partially cut-away front sectional view of an embodiment of the hybrid vertical axis energy apparatus, showing the spiral groove defined along the inner surface of a cylindrical housing assembly, and the fan disposed within the housing assembly.

FIG. 6 exemplarily illustrates a partially cut-away front sectional view of an embodiment of the hybrid vertical axis energy apparatus 101, showing the spiral groove 115 defined along the inner surface 102f of a cylindrical housing assembly 102 and the fan 121 disposed within the housing assembly 102. In this embodiment, the housing assembly 102 is of a cylindrical shape and the spiral groove 115 is defined on the inner surface 102f of the cylindrically shaped housing assembly 102. The vents 119a in this embodiment are positioned proximal to the closed upper end 102a of the housing assembly 102 to exhaust the thermal updraft of air flow to the environment from the closed upper end 102a of the housing assembly 102. As exemplarily illustrated by the curved arrows 204, the thermal updraft of air is exhausted to the environment from within the housing assembly 102 to allow a continuous stream of the thermal updraft of air to enter the housing assembly 102 through the open lower end 102b of the housing assembly 102 exemplarily illustrated by the curved arrows 202. In this embodiment, the fan 121 may also direct the thermal updraft of air centrifugally, against the spiral groove 115 as exemplarily illustrated by the curved arrows 203. This direction of thermal updraft of air towards and past the spiral groove 115 by the fan 121 creates an additional force by the thermal updraft of air to further enhance the rotation of the housing assembly 102.

Figure 7:
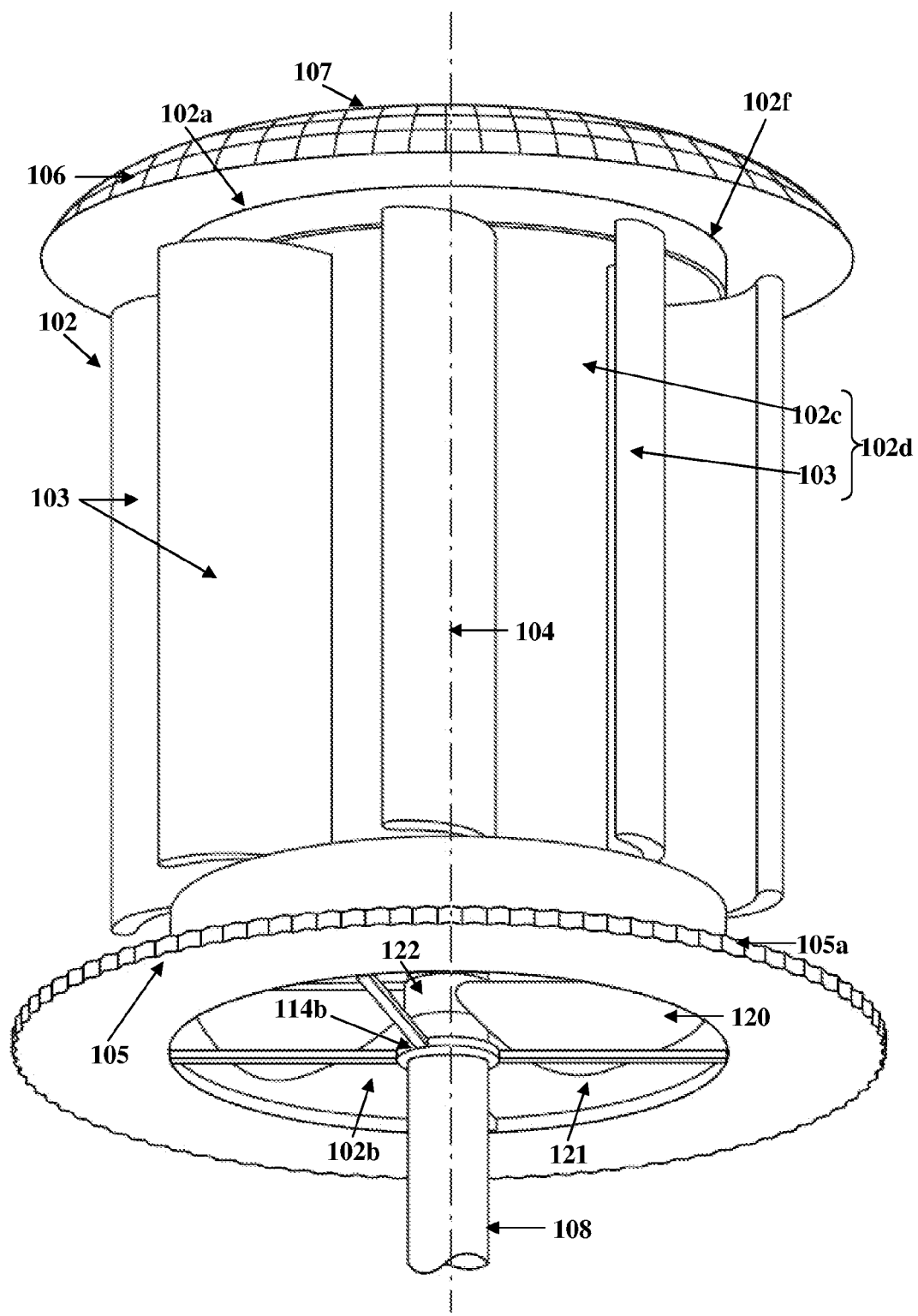
FIG. 7 exemplarily illustrates a bottom perspective view of an embodiment of the hybrid vertical axis energy apparatus, showing tear drop shaped flashings defined on an outer surface of the housing assembly.

FIG. 7 exemplarily illustrates a bottom perspective view of an embodiment of the hybrid vertical axis energy apparatus 101, showing tear drop shaped flashings 103 defined on an outer surface 102c of the housing assembly 102. Each of the flashings 103 is of a predetermined shape, for example, a tear drop shape and is arranged adjacent to each other about the vertical axle 108. The flashings 103 extend from the closed upper end 102a of the housing assembly 102 to the open lower end 102b of the housing assembly 102, where the extended flashings 103 are defined on the outer surface 102c of the housing assembly 102 and together define a winged side wall 102d around the vertical axle 108. The winged side wall 102d causes rotation of the housing assembly 102 in response to a force of wind on the flashings 103 of the winged side wall 102d. Each of the extended flashings 103 is generally equidistantly spaced from an adjacent one of the extended flashings 103. Moreover, the solar device 106 rigidly attached to the dome 107 may extend beyond a periphery 102e of the closed upper end 102a of the housing assembly 102, as exemplarily illustrated in FIG. 1A and FIGS. 2-7, to waterproof components and other structures, for example, a recess on the ceiling of a house through which rain water may seep into, etc. located near the housing assembly 102. Furthermore, the diameter of the drive mechanism 105, herein the gear ring 105a, extends beyond the diameter of the dome 107 containing the solar device 106, to enable unimpeded engagement with an adjacent gear ring 105a on an adjacent housing assembly 124.

Figure 8:
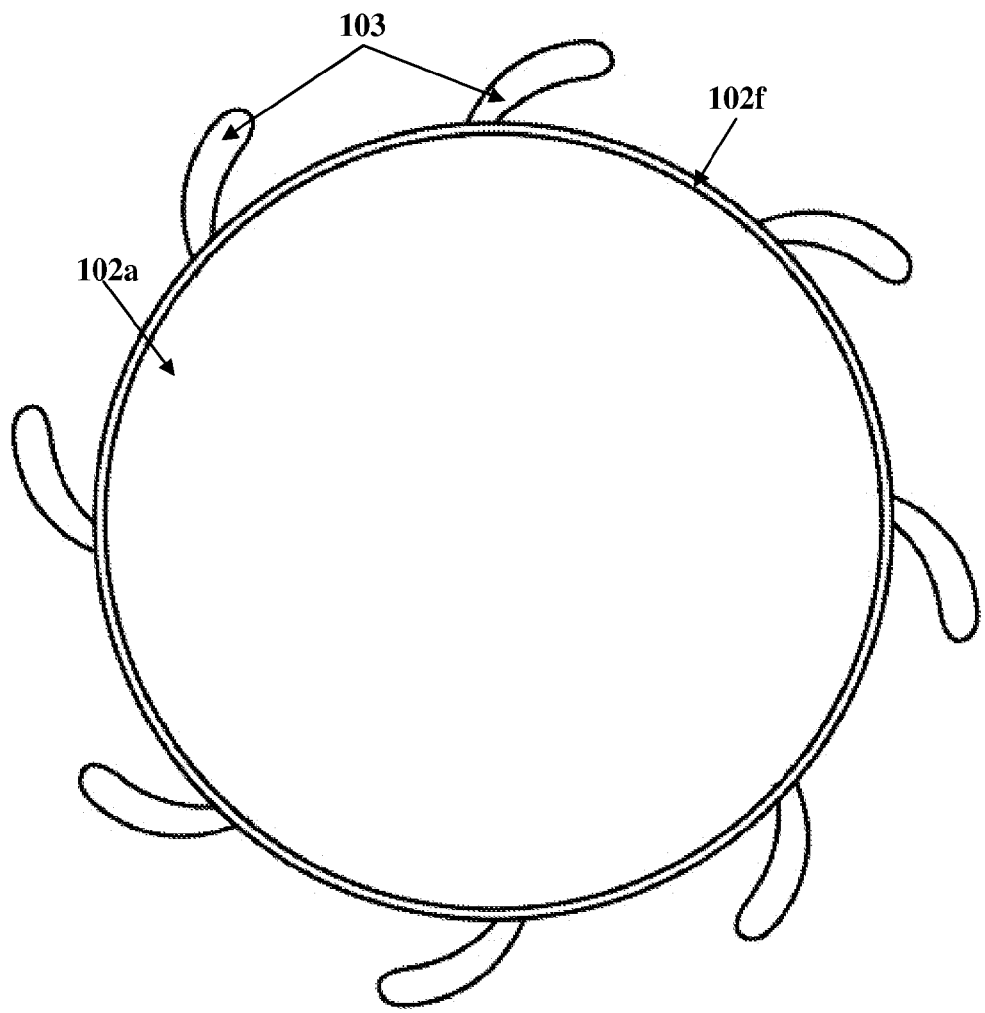
FIG. 8 exemplarily illustrates a top sectional view of an embodiment of the hybrid vertical axis energy apparatus, showing the tear drop shaped flashings having a curved profile.
Figure 9:
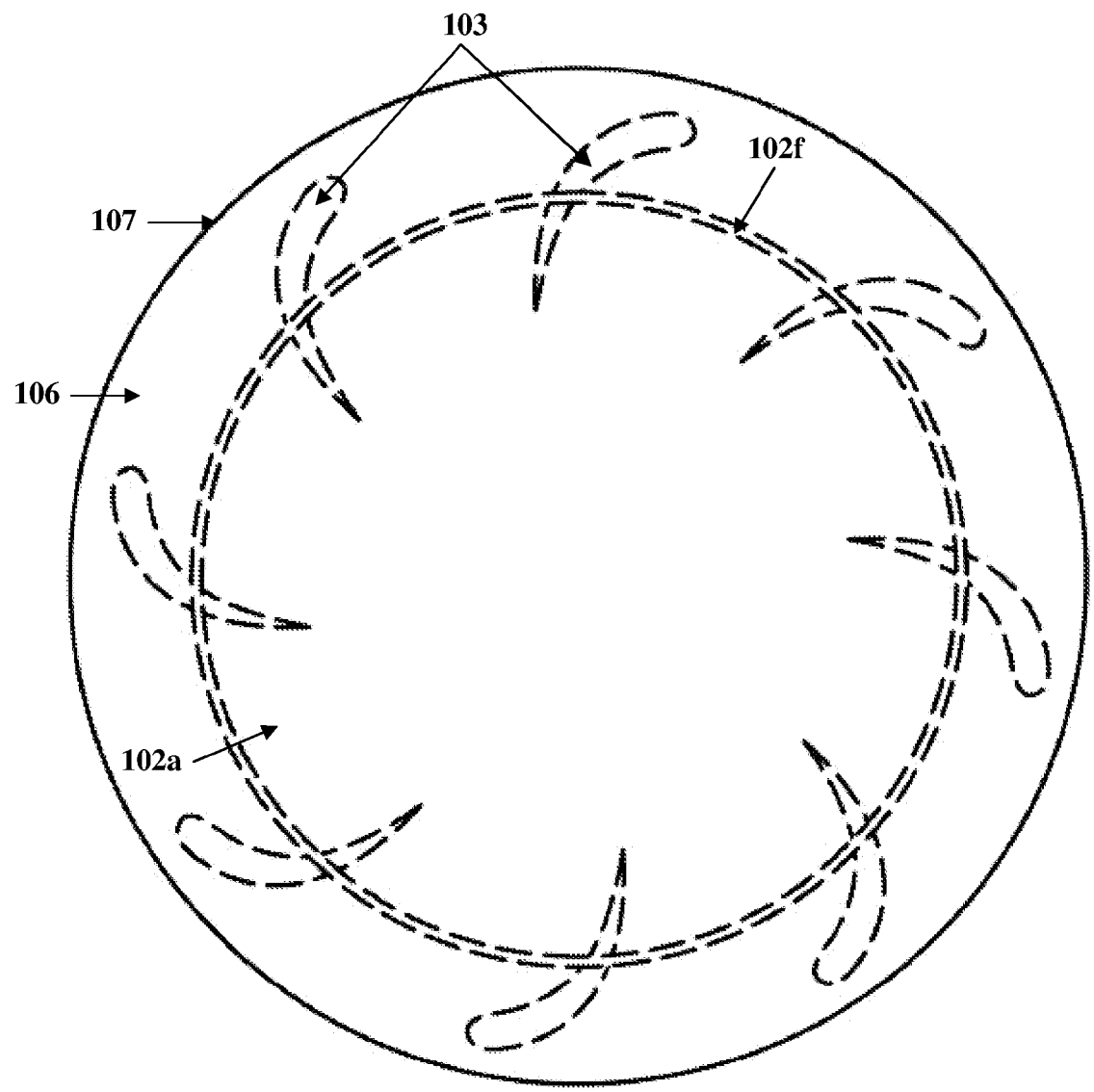
FIG. 9 exemplarily illustrates a top orthogonal view of an embodiment of the hybrid vertical axis energy apparatus, showing the tear drop shaped flashings having a curved profile, and an extended dome that accommodates the solar device.
Figure 10:
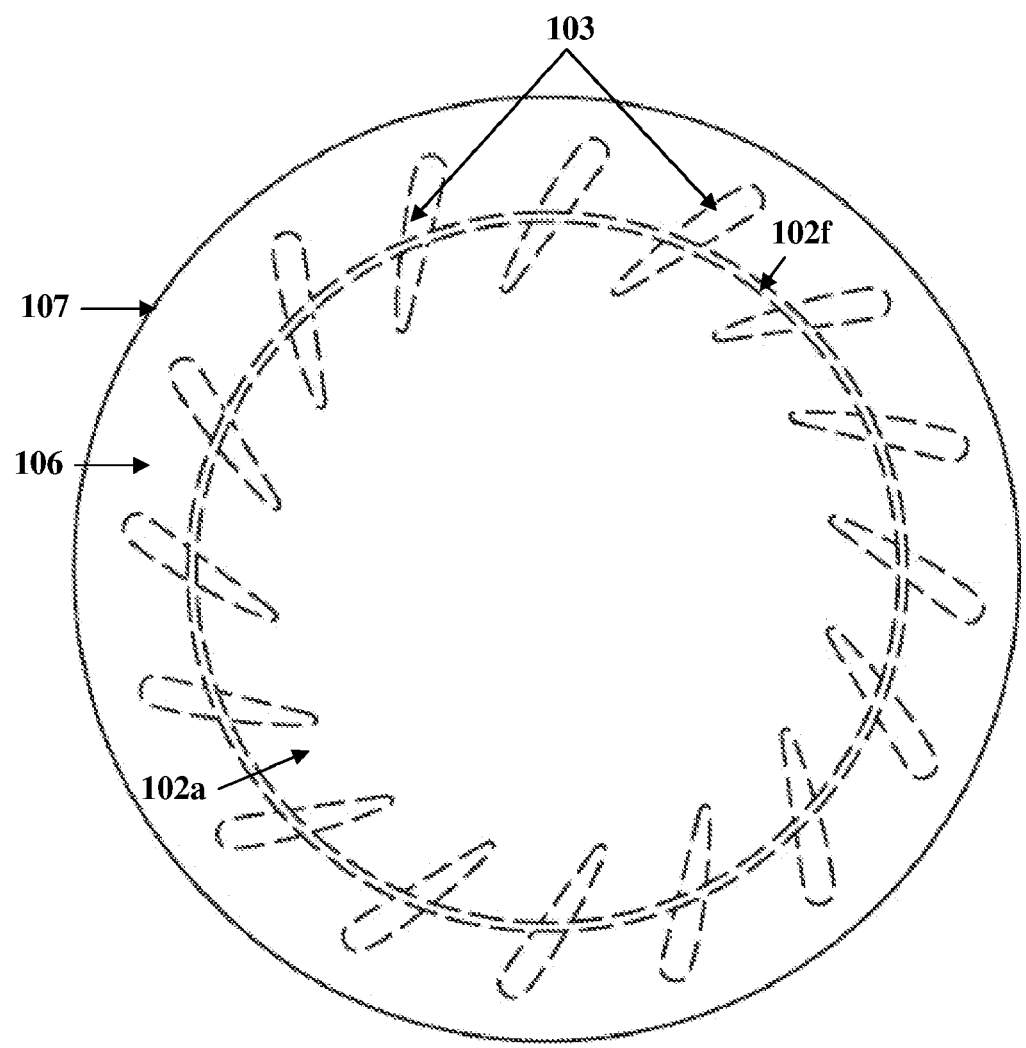
FIG. 10 exemplarily illustrates a top orthogonal view of an embodiment of the hybrid vertical axis energy apparatus, showing the tear drop shaped flashings having a straight profile, and an extended dome that accommodates the solar device.

FIGS. 8-10 exemplarily illustrate top views of embodiments of the hybrid vertical axis energy apparatus 101, showing the tear drop shaped flashings 103. FIG. 8 exemplarily illustrates a top sectional view of an embodiment of the hybrid vertical axis energy apparatus 101, showing the tear drop shaped flashings 103 having a curved profile. FIG. 9 exemplarily illustrates a top orthogonal view of an embodiment of the hybrid vertical axis energy apparatus 101, showing the tear drop shaped flashings 103 having a curved profile, and an extended dome 107 that accommodates the solar device 106. FIG. 10 exemplarily illustrates a top orthogonal view of an embodiment of the hybrid vertical axis energy apparatus 101, showing the tear drop shaped flashings 103 having a straight profile, and an extended dome 107 that accommodates the solar device 106. The flashings 103 can be exposed to wind in multiple directions based on the profile of the flashings 103. The profile of the flashings 103 is selected based on the usage requirements.

Figure 11:
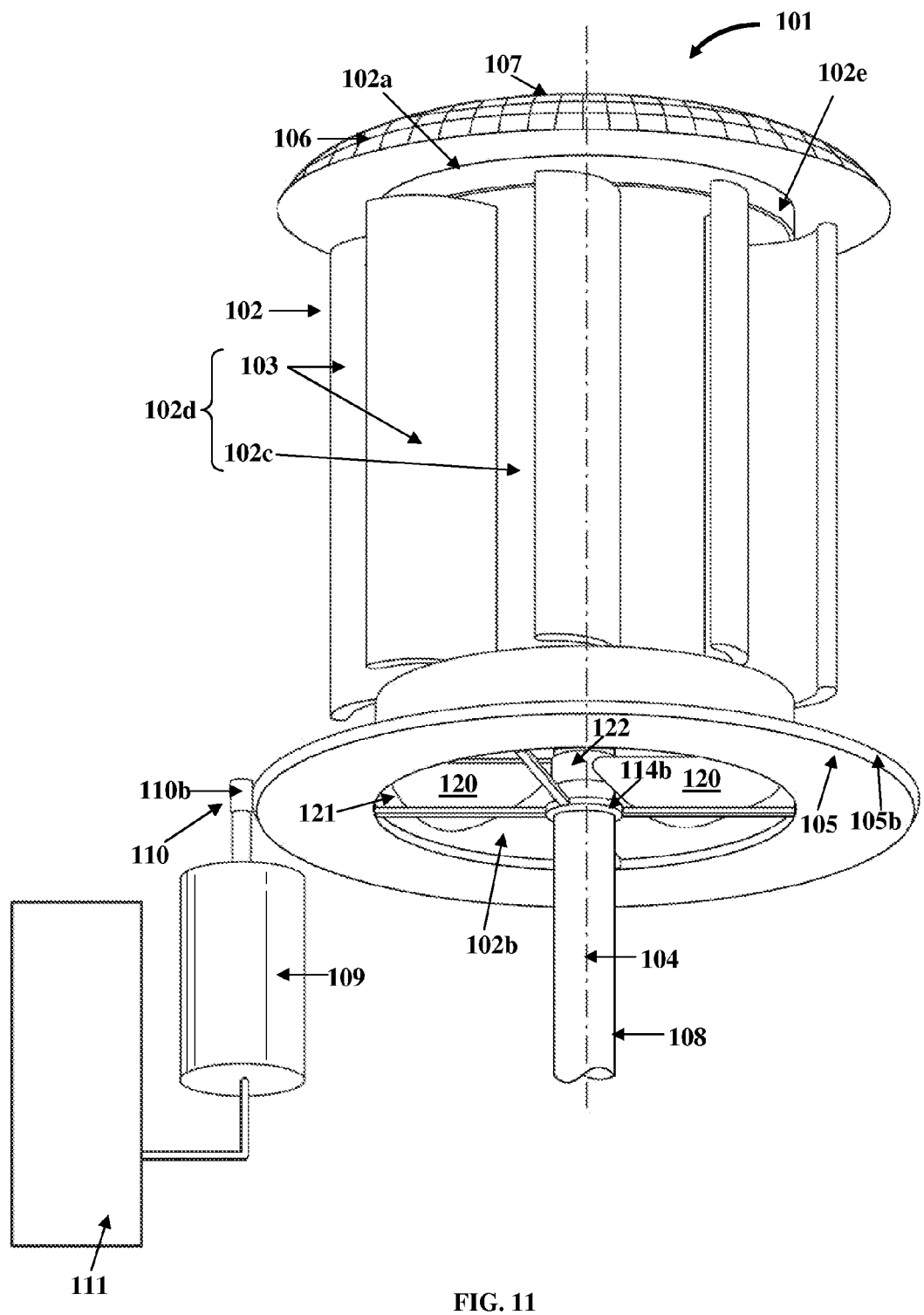
FIG. 11 exemplarily illustrates a bottom perspective view of an embodiment of the hybrid vertical axis energy apparatus, showing a housing assembly communicating with an electrical generator via corresponding drive mechanisms.

FIG. 11 exemplarily illustrates a bottom perspective view of an embodiment of the hybrid vertical axis energy apparatus 101, showing a housing assembly 102 communicating with an electrical generator 109 via corresponding drive mechanisms 105 and 110 respectively. In this embodiment, the drive mechanism 105 on the housing assembly 102 is a friction wheel 105b rigidly attached around the outer surface 102c of the housing assembly 102 at the open lower end 102b of the housing assembly 102. The friction wheel 105b transfers the mechanical energy of the housing assembly 102 to an adjacent friction wheel 105b rigidly attached on an adjacent housing assembly 124 by rolling friction. The friction wheel 105b is made of a substantially elastomeric material having a rough texture, for example, rubber. When adjacent friction wheels 105b are in contact with each other, the force of rolling friction is transferred from one friction wheel 105b to the adjacent friction wheel 105b, and hence the mechanical energy is transferred from one friction wheel 105b to the adjacent friction wheel 105b, and hence from one housing assembly 102 to an adjacent housing assembly 124, or to the electrical generator 109 via a corresponding drive mechanism 110 as the case may be. The friction wheel 105b is used as a drive mechanism 105 on the housing assembly 102 to engageably communicate with a roller wheel 110b used as the drive mechanism 110 on the electrical generator 109. The roller wheel 110b is, for example, a roller made of rubber that frictionally contacts the friction wheel 105b. The friction wheel 105b and the roller wheel 110b produce rolling friction relative to each other to allow the electrical generator 109 to take up the mechanical energy from the housing assembly 102. The electrical generator 109 then converts the mechanical energy into electrical energy. Furthermore, the diameter of the drive mechanism 105, herein the friction wheel 105b, extends beyond the diameter of the dome 107 containing the solar device 106, to enable unimpeded engagement with an adjacent friction wheel 105b rigidly attached on an adjacent housing assembly 124.

For purposes of illustration, the detailed description refers to drive mechanisms 105 and 110, for example, gear rings 105a and 110a and friction wheels 105b and 110b; however the scope of the hybrid vertical axis energy apparatus 101 disclosed herein is not limited to gear rings 105a and 110a and friction wheels 105b and 110b but may be extended to include other forms of drive systems, for example, chain drives, belt drives, and other functionally equivalent structures.

FIG. 11 further illustrates flashings 103 that extend from the closed upper end 102a of the housing assembly 102 to the open lower end 102b of the housing assembly 102, where the extended flashings 103 are defined on the outer surface 102c of the housing assembly 102 and together define a winged side wall 102d around the vertical axle 108.

Figure 12:
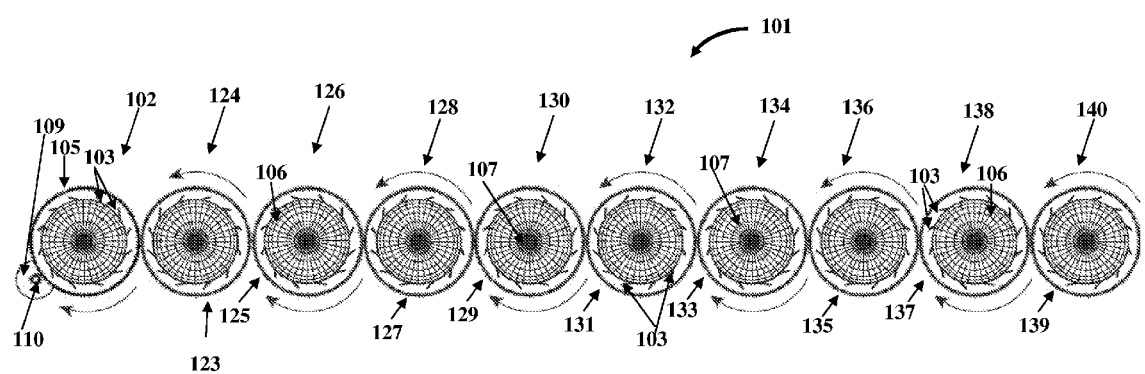
FIG. 12 exemplarily illustrates a top orthogonal view of multiple housing assemblies of an embodiment of the hybrid vertical axis energy apparatus engaged via associated drive mechanisms and arranged in a straight line configuration.

FIG. 12 exemplarily illustrates a top orthogonal view of multiple housing assemblies 102, 124, 126, 128, 130, 132, 134, 136, 138, and 140 of an embodiment of the hybrid vertical axis energy apparatus 101 engaged via associated drive mechanisms 105, 123, 125, 127, 129, 131, 133, 135, 137, and 139 and arranged in a straight line configuration. Each of the multiple housing assemblies 102, 124, 126, 128, 130, 132, 134, 136, 138, and 140 rotates in a clockwise direction or a counterclockwise direction. For example, the housing assembly 102 rotates in a clockwise direction, a first one of the adjacent housing assemblies 124 herein referred to as a "first adjacent housing assembly" rotates in a counterclockwise direction, and a second one of the adjacent housing assemblies 126 herein referred to as a "second adjacent housing assembly" rotates in a clockwise direction, and so on. Therefore, alternate housing assemblies 102, 126, 130, 134, and 138 rotate in a clockwise direction, while the alternate housing assemblies 124, 128, 132, 136, and 140 rotate in a counterclockwise direction. The flashings 103 of multiple housing assemblies 102, 124, 126, 128, 130, 132, 134, 136, 138, and 140 are oriented in opposing directions. For example, the flashings 103 on the housing assembly 102 are oriented in one direction to receive the force of wind and rotate in a clockwise direction while the flashings 103 of the first adjacent housing assembly 124 are oriented in an opposite direction to receive the same force of wind and rotate in a counterclockwise direction. In this manner, the housing assemblies 102, 124, 126, 128, 130, 132, 134, 136, 138, and 140 are designed to rotate opposite to each other.

Consider an arrangement of multiple housing assemblies 102, 124, 126, 128, 130, 132, 134, 136, 138, and 140 of the hybrid vertical axis energy apparatus 101 as exemplarily illustrated in FIG. 12. The multiple housing assemblies 102, 124, 126, 128, 130, 132, 134, 136, 138, and 140 rotate in response to a force of wind and a force of thermal updraft of air. The drive mechanisms 105, 123, 125, 127, 129, 131, 133, 135, 137, and 139 on the associated housing assemblies 102, 124, 126, 128, 130, 132, 134, 136, 138, and 140 respectively cause and assist the multiple housing assemblies 102, 124, 126, 128, 130, 132, 134, 136, 138, and 140 to rotate at the same speed. Mechanical energy produced by the rotation of the multiple housing assemblies 102, 124, 126, 128, 130, 132, 134, 136, 138, and 140 is transferred to drive the electrical generator 109 and generate electrical energy from the electrical generator 109.

Figure 17:
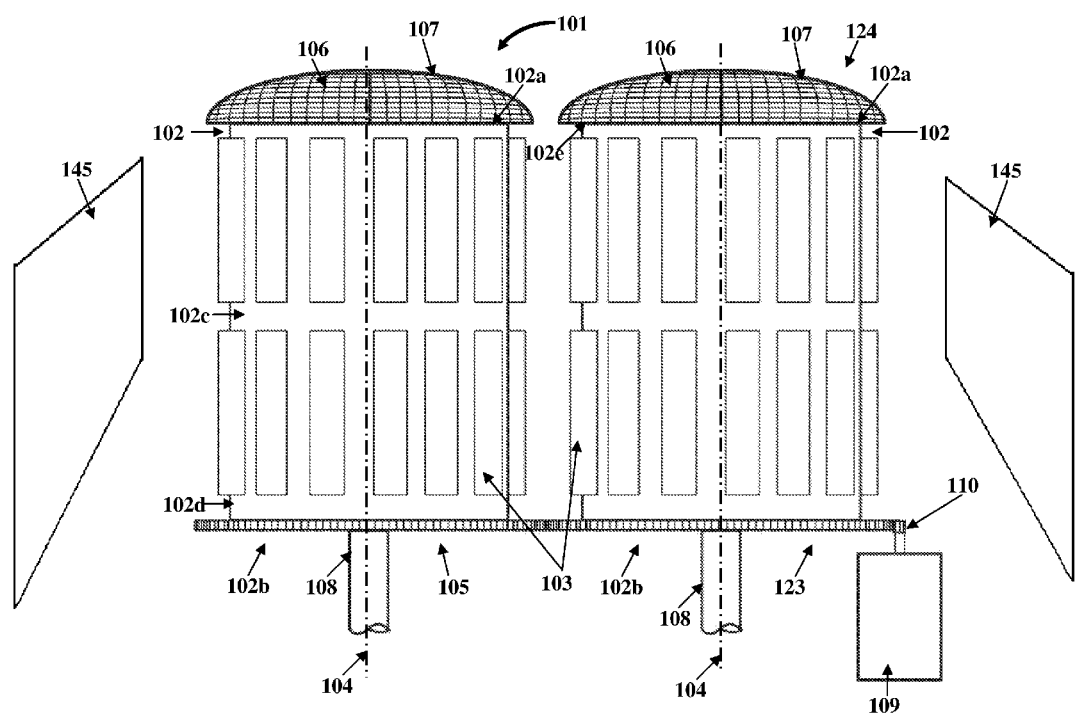
FIG. 17 exemplarily illustrates a front orthogonal view of housing assemblies of an embodiment of the hybrid vertical axis energy apparatus engaged via associated drive mechanisms and provided with a channeling device.

Consider the arrangement of multiple housing assemblies 102, 124, 126, 128, 130, 132, 134, 136, 138, and 140 of the hybrid vertical axis energy apparatus 101 illustrated in FIG. 12. The drive mechanism 110 of the electrical generator 109 is in engageable communication with the drive mechanism 105 of the housing assembly 102. In this case, on rotation of the motor 112 of each of the adjacent housing assemblies 124, 126, 128, 130, 132, 134, 136, 138, and 140, the adjacent housing assemblies 124, 126, 128, 130, 132, 134, 136, 138, and 140 rotate and transfer mechanical energy to the housing assembly 102. This transfer of mechanical energy from the adjacent housing assemblies 124, 126, 128, 130, 132, 134, 136, 138, and 140 to the housing assembly 102 is facilitated by the engageable communication of the drive mechanisms 123, 125, 127, 129, 131, 133, 135, 137, and 139 of the adjacent housing assemblies 124, 126, 128, 130, 132, 134, 136, 138, and 140 with the drive mechanism 105 of the housing assembly 102. Multiple adjacent housing assemblies 124, 126, 128, 130, 132, 134, 136, 138, and 140 rotate which in turn rotate the housing assembly 102 rotatably attached with the electrical generator 109. Hence, power is transferred to the rotating housing assembly 102 by the adjacent housing assemblies 124, 126, 128, 130, 132, 134, 136, 138, and 140. The electrical generator 109 rotatably connected to the housing assembly 102 converts the mechanical energy of the housing assembly 102 and the mechanical energy transferred from the adjacent housing assemblies 124, 126, 128, 130, 132, 134, 136, 138, and 140 into electrical energy. In another example, the drive mechanism 110 of the electrical generator 109 is in engageable communication with the adjacent drive mechanism 123 of an adjacent housing assembly 124 as illustrated in FIG. 17. In this case, the housing assembly 102 rotates to transfer mechanical energy to the adjacent housing assembly 124. The electrical generator 109 rotatably connected to the adjacent housing assembly 124 converts the transferred mechanical energy of the housing assembly 102, in addition to the mechanical energy of the adjacent housing assembly 124, into electrical energy. The transfer of mechanical energy is directed towards the housing assembly 102 or to the adjacent housing assembly 124, depending on whether the electrical generator 109 is rotatably connected to the housing assembly 102 or to the adjacent housing assembly 124.

Figure 13:
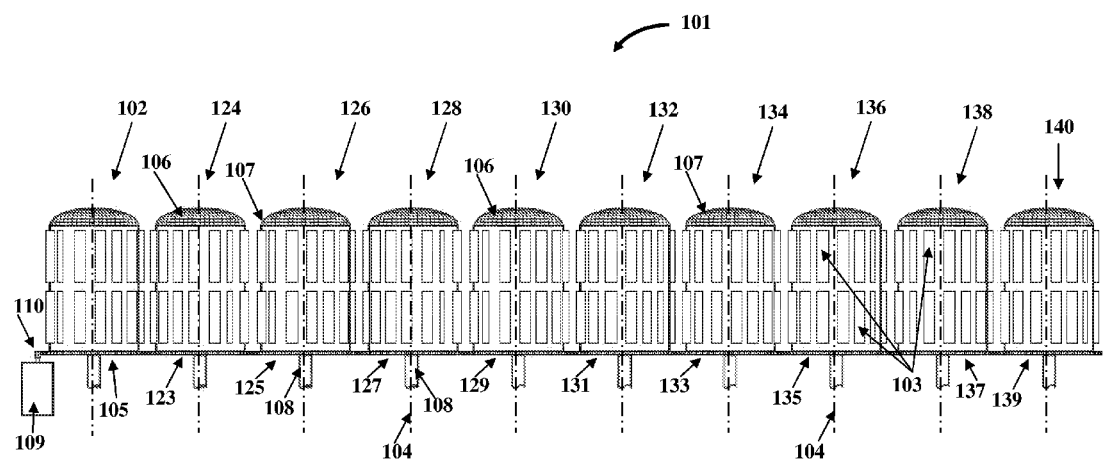
FIG. 13 exemplarily illustrates a front orthogonal view of multiple housing assemblies of an embodiment of the hybrid vertical axis energy apparatus engaged via associated drive mechanisms and arranged in a straight line configuration.

FIG. 13 exemplarily illustrates a front orthogonal view of multiple housing assemblies 102, 124, 126, 128, 130, 132, 134, 136, 138, and 140 of an embodiment of the hybrid vertical axis energy apparatus 101 engaged via associated drive mechanisms 105, 123, 125, 127, 129, 131, 133, 135, 137, and 139 and arranged in a straight line configuration. The housing assemblies 102, 124, 126, 128, 130, 132, 134, 136, 138, and 140 communicate with each other via associated drive mechanisms 105, 123, 125, 127, 129, 131, 133, 135, 137, and 139. The drive mechanism 105 of the housing assembly 102 also communicates with the drive mechanism 110 rigidly attached on the electrical generator 109. As disclosed in the detailed description of FIG. 12, each of the multiple housing assemblies 102, 124, 126, 128, 130, 132, 134, 136, 138, and 140 rotates in a clockwise direction or a counterclockwise direction. For example, the housing assembly 102 rotates in a clockwise direction, the first adjacent housing assembly 124 rotates in a counterclockwise direction, the second adjacent housing assembly 126 rotates in a clockwise direction, and so on. Therefore, alternate housing assemblies 102, 126, 130, 134, and 138 rotate in a clockwise direction, while the alternate housing assemblies 124, 128, 132, 136, and 140 rotate in a counterclockwise direction. In this manner, the housing assembly 102 in engageable communication with the adjacent housing assemblies 124, 126, 128, 130, 132, 134, 136, 138, and 140 causes the adjacent housing assemblies 124, 126, 128, 130, 132, 134, 136, 138, and 140 to rotate about the vertical axis 104 of their respective adjacent housing assemblies 124, 126, 128, 130, 132, 134, 136, 138, and 140 in a direction opposite to its direction of rotation.

Figure 14:
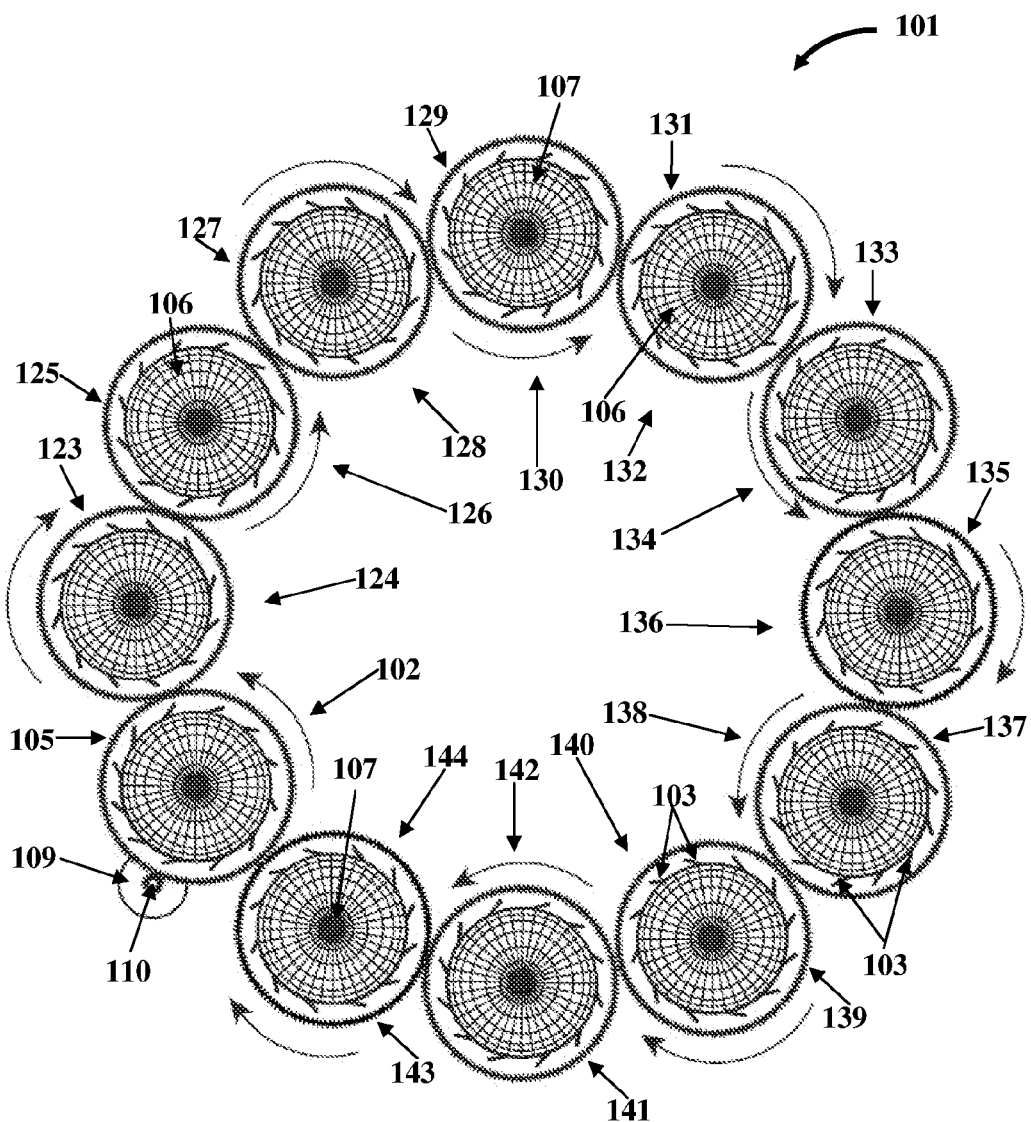
FIG. 14 exemplarily illustrates a top orthogonal view of multiple housing assemblies of an embodiment of the hybrid vertical axis energy apparatus engaged via associated drive mechanisms and arranged in a circular configuration.

FIG. 14 exemplarily illustrates a top orthogonal view of multiple housing assemblies 102, 124, 126, 128, 130, 132, 134, 136, 138, 140, 142, and 144 of an embodiment of the hybrid vertical axis energy apparatus 101 engaged via associated drive mechanisms 105, 123, 125, 127, 129, 131, 133, 135, 137, 139, 141, and 143, and arranged in a circular configuration. Each of the multiple housing assemblies 102, 124, 126, 128, 130, 132, 134, 136, 138, 140, 142, and 144 rotates in a clockwise direction or a counterclockwise direction. Mechanical energy produced by the rotation of the multiple housing assemblies 102, 124, 126, 128, 130, 132, 134, 136, 138, 140, 142, and 144 is transferred to drive the electrical generator 109 and generate electrical energy from the electrical generator 109.

Figure 15:
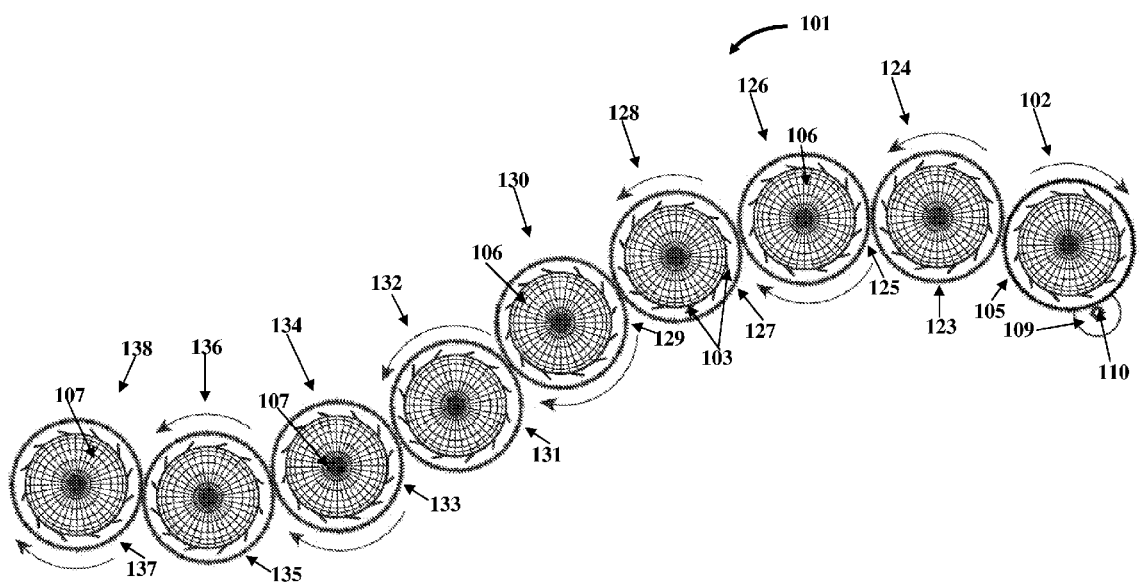
FIG. 15 exemplarily illustrate a top orthogonal view of multiple housing assemblies of an embodiment of the hybrid vertical axis energy apparatus engaged via associated drive mechanisms and arranged in a curvilinear configuration FIG. 16 exemplarily illustrates a front orthogonal view of multiple housing assemblies of another embodiment of the hybrid vertical axis energy apparatus, showing each of the housing assemblies comprising an extended dome and engaged via associated drive mechanisms.

FIG. 15 exemplarily illustrates a top orthogonal view of multiple housing assemblies 102, 124, 126, 128, 130, 132, 134, 136, and 138 of an embodiment of the hybrid vertical axis energy apparatus 101 engaged via associated drive mechanisms 105, 123, 125, 127, 129, 131, 133, 135, and 137, and arranged in a curvilinear configuration. In an embodiment, the housing assemblies 102, 124, 126, 128, 130, 132, 134, 136, 138, 140, 142, and 144 of the hybrid vertical axis energy apparatus 101 are arranged in any configuration based on the usage and space requirements. The configurations of the housing assemblies 102, 124, 126, 128, 130, 132, 134, 136, 138, 140, 142, and 144 are determined based on a predetermined study of a flow of wind and various parameters of wind such as speed, direction, altitude, etc. In another embodiment, multiple housing assemblies 102, 124, 126, 128, 130, 132, 134, 136, 138, and 140 of the hybrid vertical axis energy apparatus 101 are arranged in a straight line configuration as exemplarily illustrated in FIGS. 12-13 and FIG. 16. The housing assemblies 102, 124, 126, 128, 130, 132, 134, 136, 138, 140, 142, and 144 of the hybrid vertical axis energy apparatus 101 are arranged in a circular configuration as exemplarily illustrated in FIG. 14.

Figure 16:
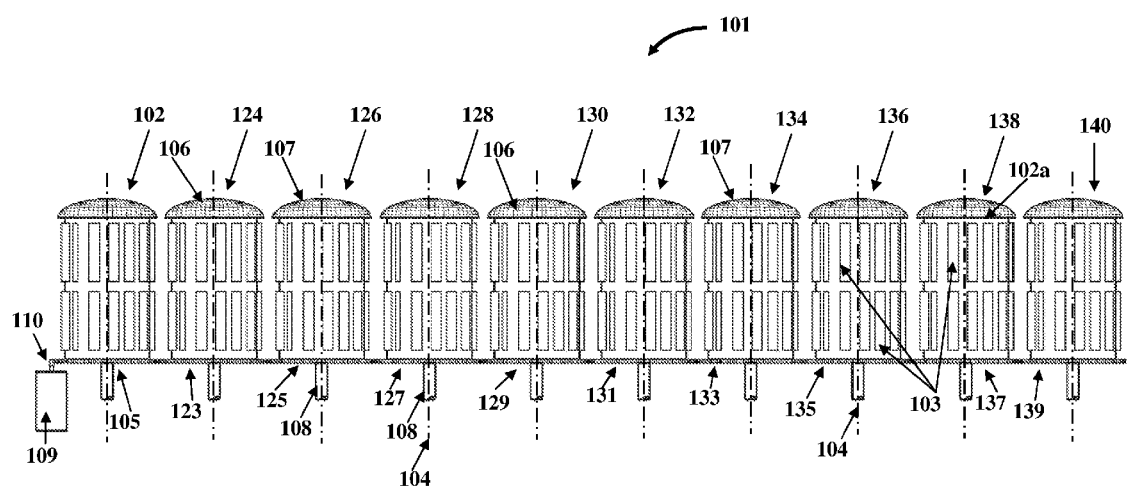

FIG. 16 exemplarily illustrates a front orthogonal view of multiple housing assemblies 102, 124, 126, 128, 130, 132, 134, 136, 138, and 140 of another embodiment of the hybrid vertical axis energy apparatus 101, showing each of the housing assemblies 102, 124, 126, 128, 130, 132, 134, 136, 138, and 140 comprising an extended dome 107 and engaged via associated drive mechanisms 105, 123, 125, 127, 129, 131, 133, 135, 137, and 139. As exemplarily illustrated in FIG. 1A, FIGS. 2-7, FIGS. 9-11, and FIGS. 16-17, the dome 107 accommodating the rigidly attached solar device 106 may extend beyond the periphery 102e of the closed upper end 102a of each of the housing assemblies 102, 124, 126, 128, 130, 132, 134, 136, 138, and 140 to waterproof components and other structures located near the housing assemblies 102, 124, 126, 128, 130, 132, 134, 136, 138, and 140.

FIG. 17 exemplarily illustrates a front orthogonal view of housing assemblies 102 and 124 of an embodiment of the hybrid vertical axis energy apparatus 101 engaged via associated drive mechanisms 105 and 123, and provided with a channeling device 145. The channeling device 145 is detachably engaged to the hybrid vertical axis energy apparatus 101 to streamline the force of wind on the flashings 103 of the housing assembly 102 and the adjacent housing assembly 124. The channeling device 145 maximizes the force of wind on the flashings 103 of the housing assembly 102 and the adjacent housing assembly 124 and causes rotation of the housing assembly 102 and the adjacent housing assembly 124 in opposite directions, that is, a clockwise direction and a counterclockwise direction.

Figure 18:
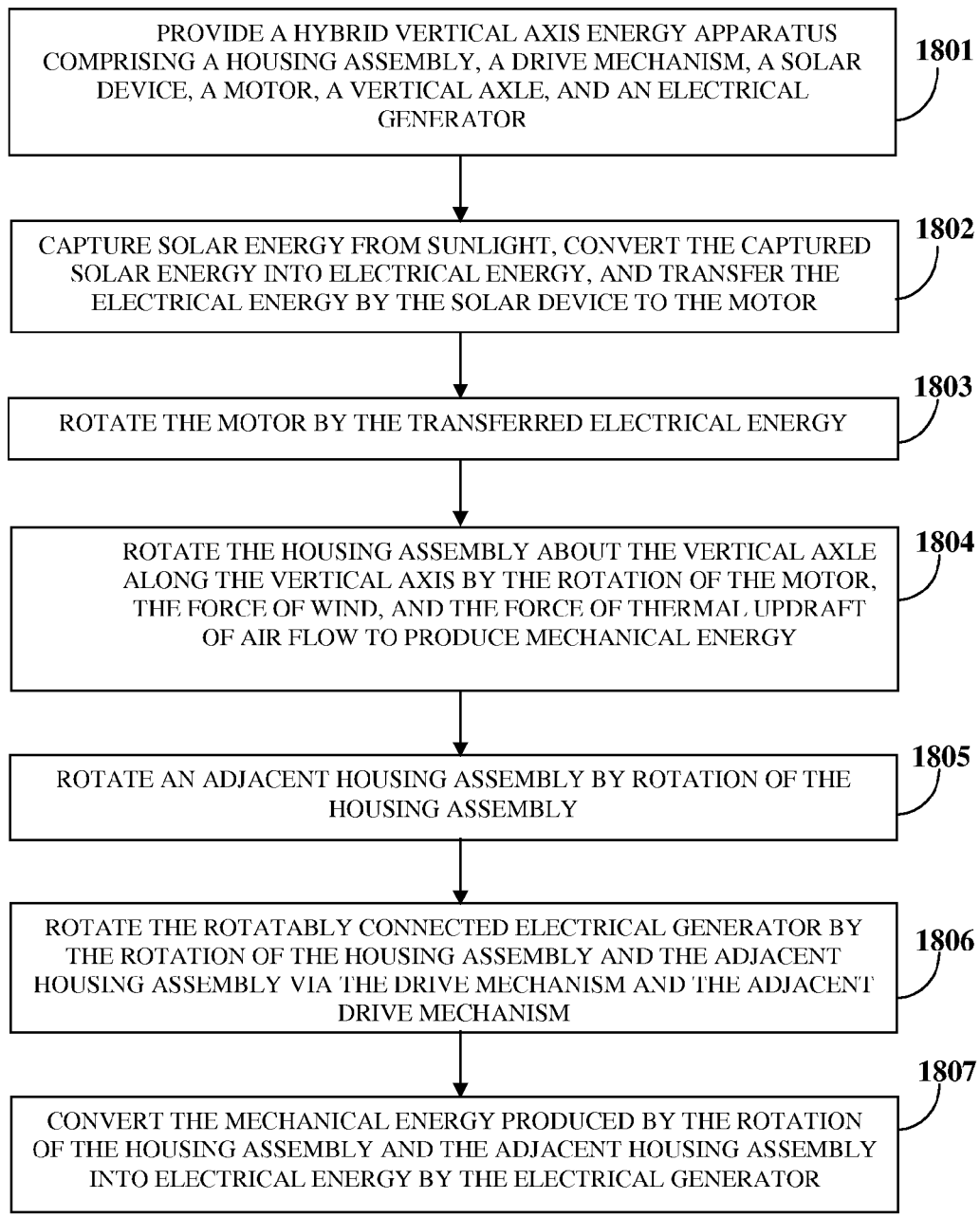
FIG. 18 exemplarily illustrates a method for producing energy.

FIG. 18 exemplarily illustrates a method for producing energy. A hybrid vertical axis energy apparatus 101 comprising a housing assembly 102, a drive mechanism 105, a solar device 106, a motor 112, a vertical axle 108, and an electrical generator 109 as disclosed in the detailed description of FIGS. 1A-1B and FIG. 2 is provided 1801. The solar device 106 captures 1802 solar energy from sunlight and converts the captured solar energy into electrical energy. The solar device 106 transfers 1802 the electrical energy to the motor 112. The motor 112 is rotated 1803 by the transferred electrical energy. The housing assembly 102 is rotated 1804 about the vertical axle 108 along the vertical axis 104 by the rotation of the motor 112, the force of wind on the flashings 103, and the force of thermal updraft of air through the open lower end 102b of the housing assembly 102 and against the spiral groove 115, to produce mechanical energy. In an embodiment, the solar device 106 and the motor 112 cause rotation of the housing assembly 102 continuously during operation of the hybrid vertical axis energy apparatus 101. In another embodiment, the solar device 106 and the motor 112 are electrically disconnected by the switch 117, and the electrical energy produced by the solar device 106 is transferred to the storage device 111 via the switch 117. In this embodiment, the rotation of the housing assembly 102 is caused by the force of wind and the force of thermal updraft of air after the electrical disconnection. An adjacent housing assembly 124 is rotated 1805 by the rotation of the housing assembly 102 due to the engageable communication between the housing assembly 102 and the adjacent housing assembly 124. The rotatably connected electrical generator 109 is rotated 1806 by the rotation of the housing assembly 102 and the adjacent housing assembly 124 via the drive mechanism 105 or the adjacent drive mechanism 123 respectively. The electrical generator 109 converts 1807 the mechanical energy produced by the rotation of the housing assembly 102 and the adjacent housing assembly 124 into electrical energy, thereby producing energy.

Figure 19:
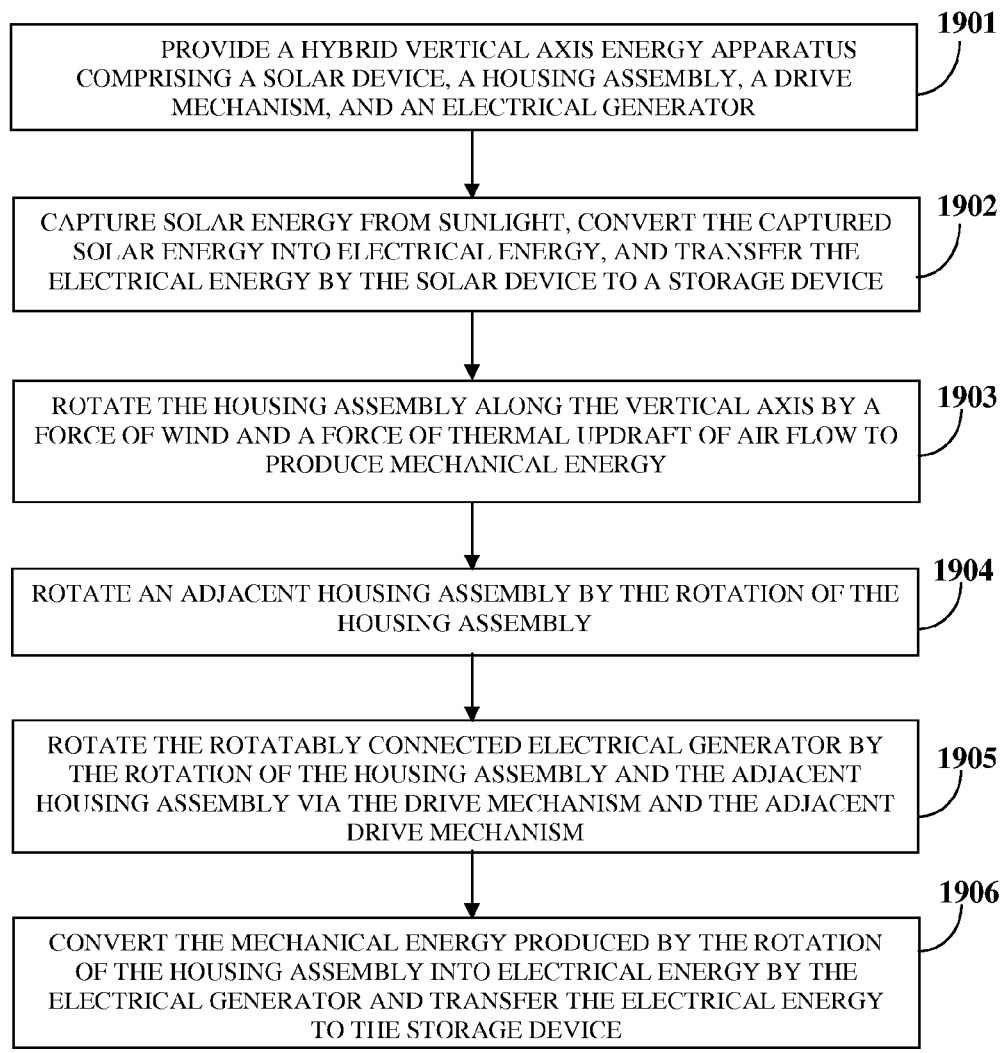
FIG. 19 exemplarily illustrates an embodiment of the method for producing energy.

FIG. 19 exemplarily illustrates an embodiment of the method for producing energy. A hybrid vertical axis energy apparatus 101 comprising a solar device 106, a housing assembly 102, a drive mechanism 105, and an electrical generator 109 as disclosed in the detailed description of FIG. 3 is provided 1901. The solar device 106 captures 1902 solar energy from sunlight and converts the captured solar energy into electrical energy. The solar device 106 transfers 1902 the electrical energy to a storage device 111. The housing assembly 102 is rotated 1903 along the vertical axis 104 by the force of wind on the flashings 103 and the force of thermal updraft of air flow against the spiral groove 115 to produce mechanical energy. An adjacent housing assembly 124 is rotated 1904 by the rotation of the housing assembly 102 due to the engageable communication between the housing assembly 102 and the adjacent housing assembly 124. The rotatably connected electrical generator 109 is rotated 1905 by the rotation of the housing assembly 102 and the adjacent housing assembly 124 via the drive mechanism 105 or the adjacent drive mechanism 123 respectively. The electrical generator 109 converts 1906 the mechanical energy produced by the rotation of the housing assembly 102 and the adjacent housing assembly 124 into electrical energy and transfers the electrical energy to the storage device 111. The hybrid vertical axis energy apparatus 101 thereby produces energy. A slip ring 116 is connected to and is in electric communication with the solar device 106 to allow a continuous transfer of the electrical energy from the solar device 106 to the storage device 111.

The foregoing examples have been provided merely for the purpose of explanation and are in no way to be construed as limiting of the present invention disclosed herein. While the invention has been described with reference to various embodiments, it is understood that the words, which have been used herein, are words of description and illustration, rather than words of limitation. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

We claim:

1. A hybrid vertical axis energy apparatus, comprising:
    a solar device rigidly attached to an upper end of a housing assembly, wherein said solar device captures solar energy from sunlight and converts said solar energy into electrical energy;
    a motor connected to and in electric communication with said solar device, wherein said motor is coaxially disposed below said solar device;
    a vertical axle rigidly connected to an axial shaft of said motor, wherein said vertical axle is coaxially positioned within said housing assembly along said vertical axis of said housing assembly, wherein said housing assembly is rotatably connected to said vertical axle;
    said housing assembly configured to rotate along its vertical axis in response to a force of wind and a force of thermal updraft of air flow;
    a drive mechanism rigidly attached to said housing assembly, wherein said drive mechanism is in engageable communication with an adjacent drive mechanism attached on an adjacent housing assembly; and
    an electrical generator rotatably connected to one of said housing assembly and said adjacent housing assembly via one of said drive mechanism and said adjacent drive mechanism respectively, wherein said electrical generator converts mechanical energy produced by rotation of said housing assembly and said adjacent housing assembly into electrical energy;
    whereby said hybrid vertical axis energy apparatus produces energy.

2. The hybrid vertical axis energy apparatus of claim 1, further comprising a slip ring connected to and in electric communication with said solar device to allow a continuous transfer of said electrical energy from said solar device to a storage device.

3. The hybrid vertical axis energy apparatus of claim 1, wherein said housing assembly comprises flashings defining an outer surface of said housing assembly, wherein said housing assembly rotates along said vertical axis in response to said force of wind on said flashings.

4. The hybrid vertical axis energy apparatus of claim 3, wherein said housing assembly comprises a side wall, wherein said flashings are defined along said side wall of said housing assembly.

5. The hybrid vertical axis energy apparatus of claim 3, further comprising vents defined by said flashings on said housing assembly to exhaust said thermal updraft of air flow from said housing assembly.

6. The hybrid vertical axis energy apparatus of claim 1, further comprising a plurality of vents on said housing assembly positioned proximal to said upper end of said housing assembly to exhaust said thermal updraft of air flow from said housing assembly.

7. The hybrid vertical axis energy apparatus of claim 1, wherein said housing assembly comprises a generally spiral groove defined along an inner surface of said housing assembly, wherein said housing assembly rotates along said vertical axis in response to said force of said thermal updraft of air flow against said generally spiral groove.

8. The hybrid vertical axis energy apparatus of claim 1, wherein said electrical generator comprises a drive mechanism in engageable communication with one of said drive mechanism and said adjacent drive mechanism on one of said housing assembly and said adjacent housing assembly respectively, wherein said one of said drive mechanism and said adjacent drive mechanism on said one of said housing assembly and said adjacent housing assembly engageably communicates with said drive mechanism of said electrical generator for transferring said mechanical energy produced by said rotation of said housing assembly and said adjacent housing assembly to said electrical generator.

9. The hybrid vertical axis energy apparatus of claim 1, further comprising a dome positioned on said upper end of said housing assembly for accommodating said solar device.

10. The hybrid vertical axis energy apparatus of claim 1, wherein said drive mechanism on said housing assembly is one of a gear ring and a friction wheel, and wherein a drive mechanism provided on said electrical generator is a corresponding one of a gear ring and a roller wheel.

11. The hybrid vertical axis energy apparatus of claim 1, further comprising one of a bearing and a sleeve for enabling said rotatable connection of said housing assembly to a vertical axle.

12. The hybrid vertical axis energy apparatus of claim 1, further comprising a fan disposed within said housing assembly, wherein said fan is rigidly attached to said housing assembly and rotatably attached to a vertical axle by a bearing, wherein said fan rotates in response to said force of said thermal updraft of air flow to rotate said housing assembly.

13. The hybrid vertical axis energy apparatus of claim 1, further comprising a storage device electrically connected to said solar device and said electrical generator to store said electrical energy.

14. The hybrid vertical axis energy apparatus of claim 13, further comprising a switch in electric communication with said solar device, a motor connected to and in electric communication with said solar device, and said storage device, wherein said switch electrically disconnects said solar device from said motor and transfers said electrical energy produced by said solar device to said storage device.

15. The hybrid vertical axis energy apparatus of claim 14, further comprising a slip ring positioned on an axial shaft of a motor connected to and in electric communication with said solar device to enable said solar device to transmit said electrical energy to said storage device on said electrical disconnection of said motor from said solar device.

16. The hybrid vertical axis energy apparatus of claim 1, wherein said housing assembly is connected to said adjacent housing assembly and arranged in one of a straight line configuration, a circular configuration, and a curvilinear configuration.

17. The hybrid vertical axis energy apparatus of claim 1, wherein a channeling device is detachably attached to said hybrid vertical axis energy apparatus to streamline said force of wind on said flashings of said housing assembly and said adjacent housing assembly.

18. A hybrid vertical axis energy apparatus, comprising:
  a housing assembly comprising:
    flashings defining an outer surface of said housing assembly; and
    a generally spiral groove defined along an inner surface of said housing assembly, wherein said housing assembly rotates along its vertical axis in response to a force of wind on said flashings and a force of thermal updraft of air flow against said generally spiral groove;
  a drive mechanism rigidly attached to said housing assembly, wherein said drive mechanism is in engageable communication with an adjacent said drive mechanism attached on an adjacent said housing assembly;
  a solar device rigidly attached to an upper end of said housing assembly;
  a motor connected to and in electric communication with said solar device, wherein said motor is coaxially disposed below said solar device;
  a vertical axle rigidly connected to an axial shaft of said motor, wherein said vertical axle is coaxially positioned within said housing assembly along said vertical axis of said housing assembly, wherein said housing assembly is rotatably connected to said vertical axle; and
  an electrical generator rotatably connected to one of said housing assembly and said adjacent housing assembly via one of said drive mechanism and said adjacent drive mechanism respectively, wherein said electrical generator converts mechanical energy produced by rotation of said housing assembly and said adjacent housing assembly into electrical energy;
  whereby said hybrid vertical axis energy apparatus produces energy.

19. A method for producing energy, comprising:
  providing a hybrid vertical axis energy apparatus comprising:
    a housing assembly configured to rotate along its vertical axis in response to a force of wind and a force of thermal updraft of air flow, wherein said housing assembly comprises:
      flashings defining an outer surface of said housing assembly; and
      a generally spiral groove defined along an inner surface of said housing assembly;
    a drive mechanism rigidly attached to said housing assembly, wherein said drive mechanism is in engageable communication with an adjacent said drive mechanism attached on an adjacent said housing assembly;
    a solar device rigidly attached to an upper end of said housing assembly;
    a motor connected to and in electric communication with said solar device, wherein said motor is coaxially disposed below said solar device;
    a vertical axle rigidly connected to an axial shaft of said motor, wherein said vertical axle is coaxially positioned within said housing assembly along said vertical axis of said housing assembly, wherein said housing assembly is rotatably connected to said vertical axle; and
    an electrical generator rotatably connected to one of said housing assembly and said adjacent housing assembly via one of said drive mechanism and said adjacent drive mechanism respectively;
  capturing solar energy from sunlight and converting said captured solar energy into electrical energy by said solar device, wherein said solar device transfers said electrical energy to said motor;
  rotating said motor by said transferred electrical energy;
  rotating said housing assembly about said vertical axle along said vertical axis by said rotation of said motor, said force of wind on said flashings, and said force of thermal updraft of air flow against said generally spiral groove to produce mechanical energy, wherein said rotation of said housing assembly rotates said adjacent housing assembly due to said engageable communication between said housing assembly and said adjacent housing assembly; and
  rotating said rotatably connected electrical generator by said rotation of said housing assembly and said adjacent housing assembly via one of said drive mechanism and said adjacent drive mechanism respectively, wherein said electrical generator converts said mechanical energy produced by said rotation of said housing assembly and said adjacent housing assembly into electrical energy;
  whereby said energy is produced by said hybrid vertical axis energy apparatus.

* * * * *